United States Patent
Shim

[19]

[11] Patent Number: 5,854,516

[45] Date of Patent: Dec. 29, 1998

[54] METHOD AND APPARATUS FOR GENERATING ELECTRIC POWER USING WAVE FORCE

[76] Inventor: Hyun Jin Shim, 350-59, Sangdo 3-Dong, Dongjak-Ku, Seoul, Rep. of Korea

[21] Appl. No.: 710,848

[22] Filed: Sep. 23, 1996

[30] Foreign Application Priority Data

Apr. 18, 1996 [KR] Rep. of Korea ................. 1996-11790

[51] Int. Cl.$^6$ ............................. F03B 13/10; F03B 13/12
[52] U.S. Cl. ................................ 290/53; 290/42; 290/43; 290/54; 60/497; 60/499; 60/397
[58] Field of Search .................. 290/42, 43, 53, 290/54; 417/100, 330, 331; 60/497, 499, 397

[56] References Cited

U.S. PATENT DOCUMENTS

| | | | |
|---|---|---|---|
| 4,560,884 | 12/1985 | Whittecar | 290/42 |
| 4,568,836 | 2/1986 | Reenberg | 290/53 |
| 4,622,473 | 11/1986 | Curry | 290/53 |
| 4,684,815 | 8/1987 | Gargos | 290/53 |
| 4,719,754 | 1/1988 | Nishikawa | 60/501 |
| 4,781,023 | 11/1988 | Gordon | 60/506 |
| 4,815,286 | 3/1989 | Watanabe | 60/398 |
| 4,858,434 | 8/1989 | Masuda | 60/398 |
| 5,027,000 | 6/1991 | Chino et al. | 290/53 |
| 5,066,867 | 11/1991 | Shim | 290/53 |
| 5,311,064 | 5/1994 | Kumbatovic | 290/53 |

*Primary Examiner*—Nestor Ramirez
*Assistant Examiner*—Elvin G. Enad
*Attorney, Agent, or Firm*—David E. Lovejoy

[57] ABSTRACT

An improved electric power generation apparatus using a wave force and a method thereof which are capable of protecting the system from waves having a predetermined height higher than the previously set height based on the climate condition at the construction site of the system, which includes the steps of lifting/lowering a plurality of buoys in response to waves applied thereto, each of said buoys being connected to each of a plurality of support members disposed at a lattice-type frame submerged within sea, converting the lifting/lowering movement of each buoy into a rotation force, a driving compressed liquid generation unit provided at each buoy in cooperation with the rotation force, transferring the compressed liquid generated in the operation of the compressed liquid generation unit to a main transferring tube, driving a turbine using the compressed liquid transferred thereto through the main transferring tube, and generating power by driving a power generator drivingly communicating with the turbine.

26 Claims, 29 Drawing Sheets

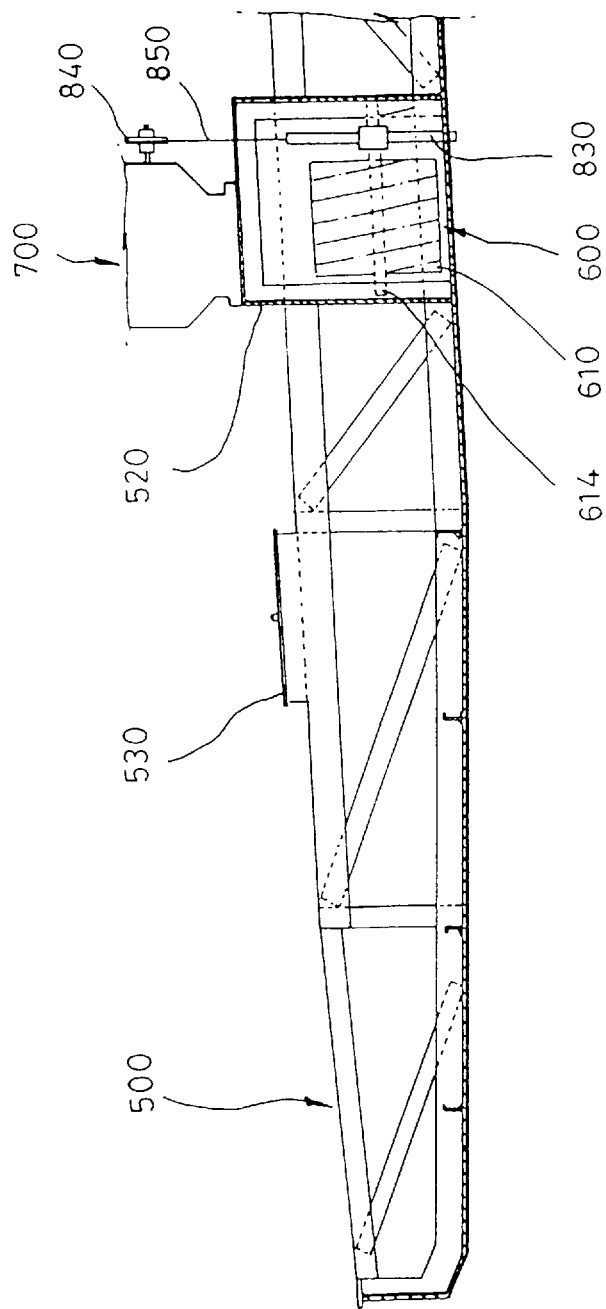

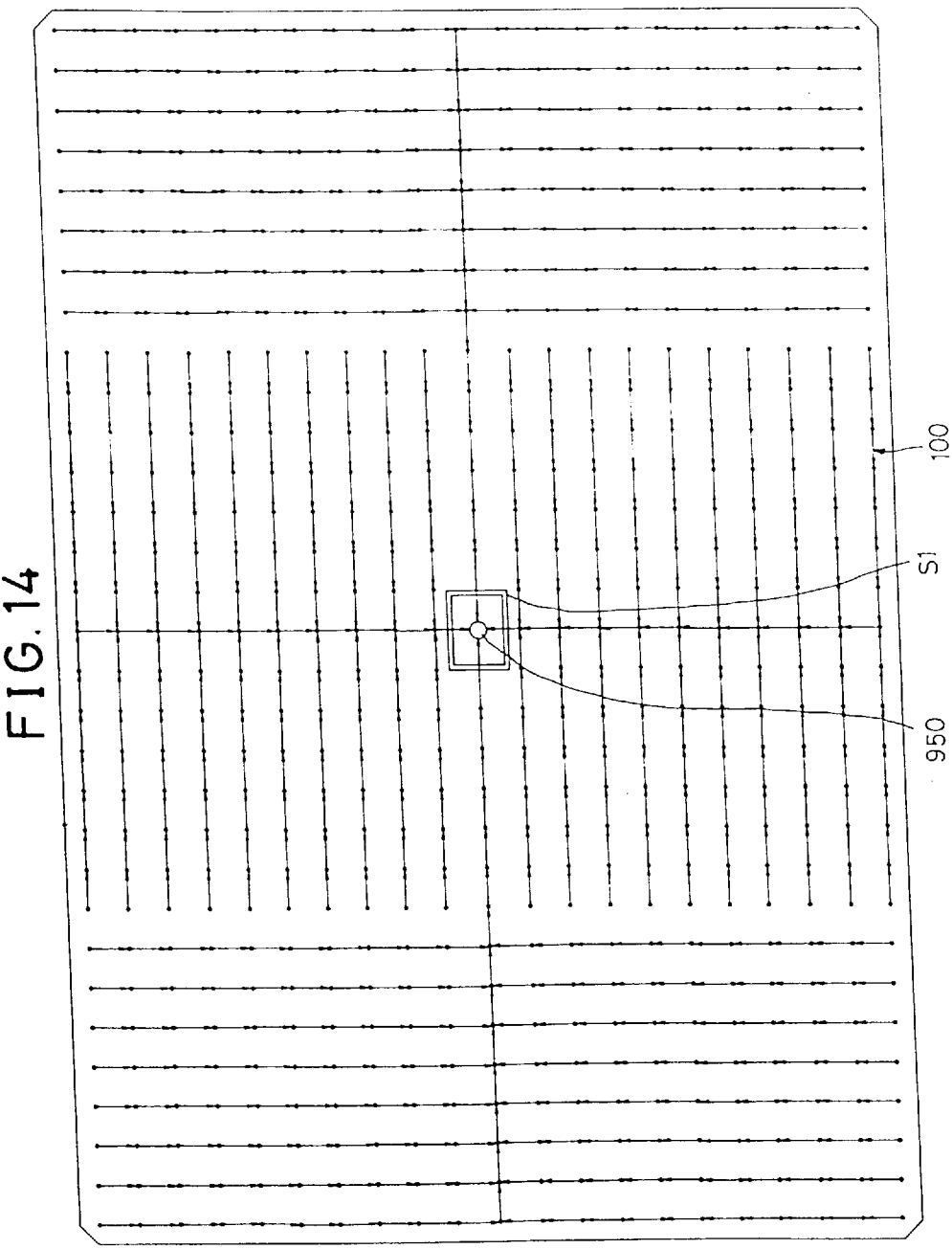

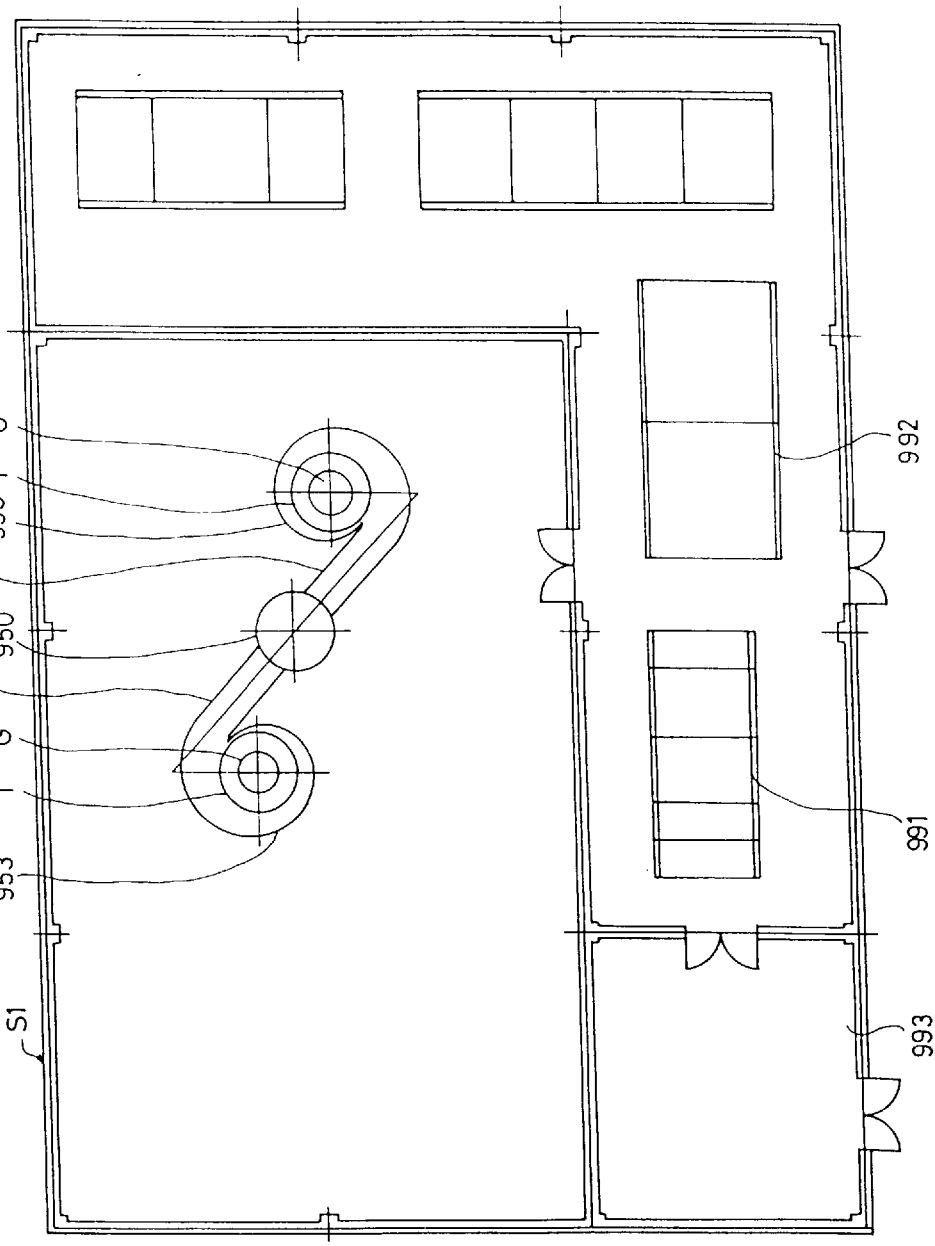

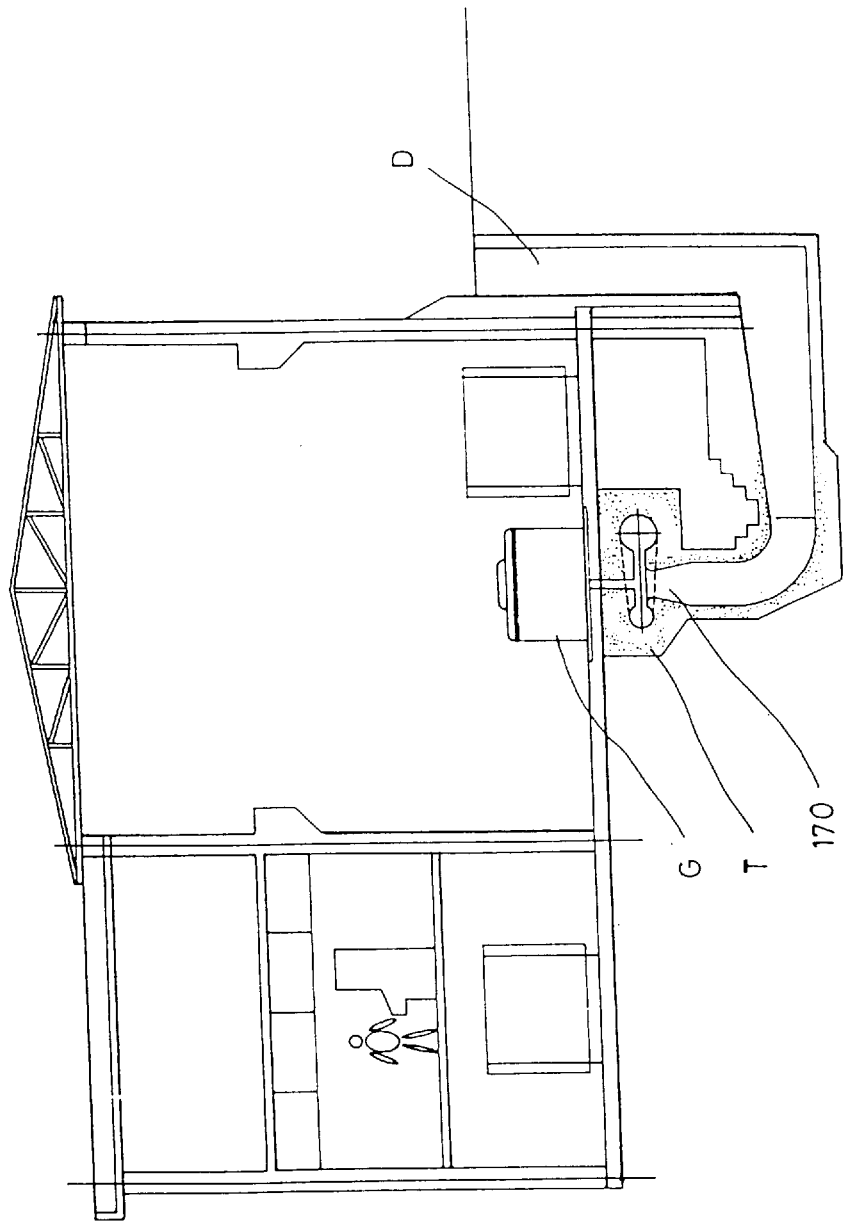

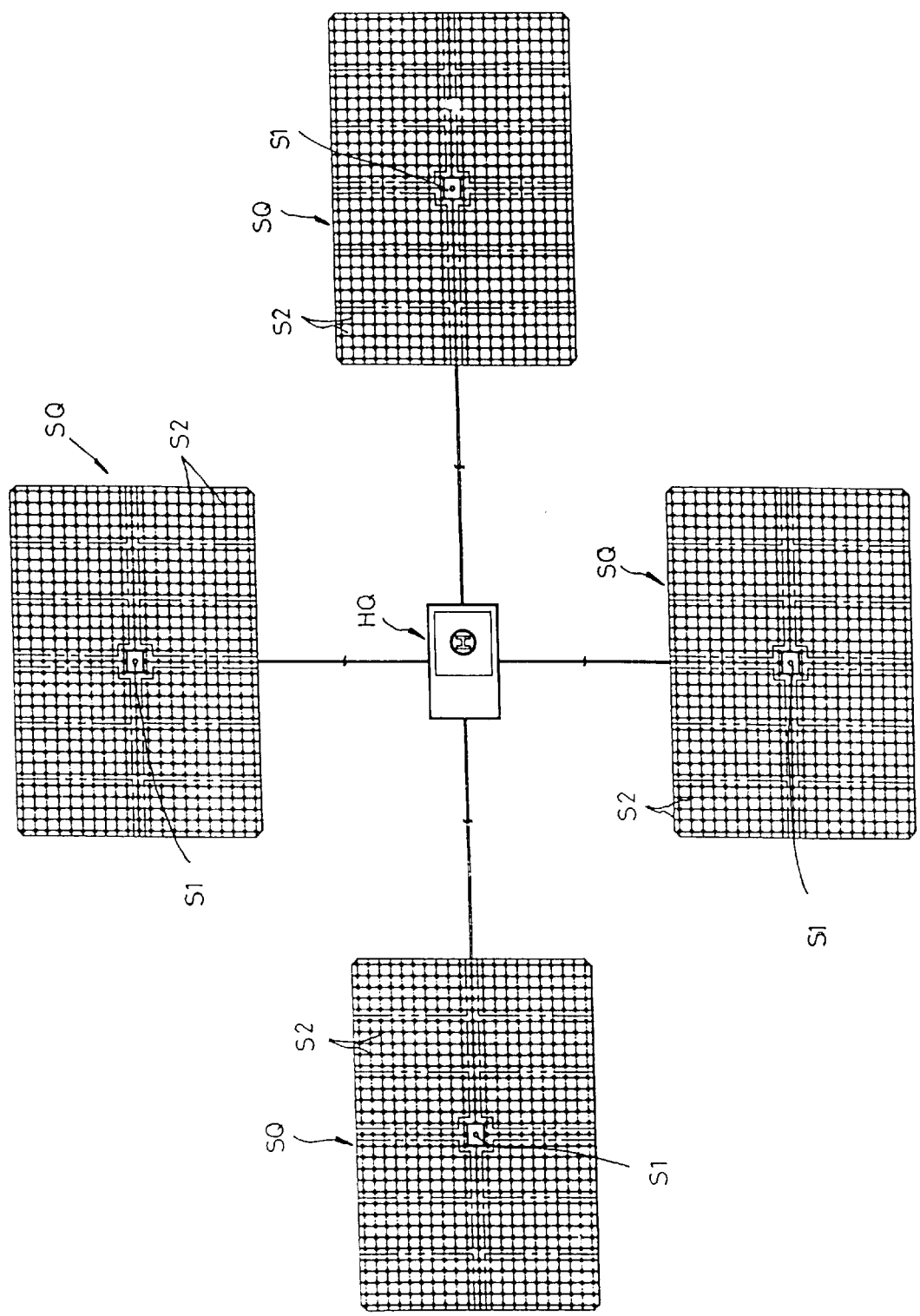

METHOD AND APPARATUS FOR GENERATING ELECTRIC POWER USING WAVE FORCE

BACKGROUND OF THE INVENTION

1. Field of the Invention

The present invention relates to a method and apparatus for generating an electric power using a wave force, and in particular to an improved method and apparatus for generating an electric power using a wave force which are capable of generating a desired electric power irrespective of a water flowing direction and preventing the damage of a float or a missing thereof caused by a wave force applied thereto.

2. Description of the Conventional Art

Recently, energy deficiency becomes an international issue in various aspects. Among are an air pollution and a fossil energy depletion caused by an increasing use of a fossil energy.

The development of the alternative energy is urgently needed in the industry in order to effectively cope with the above-mentioned problems.

An electric power generation system using a hydraulic force has been widely used for generating a desired electric power. However, this method has disadvantages in that a wide range of land area where a power generation factory is built is required so as to gather water.

In addition, another method of using a wind force has been used. However, since the method is directed to using a relatively strong wind which is not always present in the nature, so it is very difficult to continuously get a desired amount of voltage.

As an alternative energy of the fossil energy being currently used in the industry, the nuclear energy is mainly used. However, the use of the nuclear energy internationally becomes a big issue due to its harmful waste treatment method and a radioactive leakage problem. In addition, it is very difficult to set up a factory of the nuclear waste treatment and the like due to the localism of a resident who lives in the region where the nuclear power generator is built, and the distrust on the stability of the nuclear waste treatment.

Moreover, in order to resolve the above-mentioned problems, a method of using solar energy as a clean energy is widely studied; however, while it is available to use the same outside the Earth's atmosphere for a space station or a satellite, it is impossible to use effectively the same inside the Earth's atmosphere due to rapidly changing weather, the lack of effective sunny days, and the low intensity of sun rays due to air pollution. That is, due to the above-described problems, the solar energy is limitedly used for heating a solar energy facility of home or the like due to its low efficiency.

In addition, an electric power generating method of using tide has been studied; however, since the construction site thereof is limited to sea where a desired tide is present, it is impossible to satisfy a growing amount of electric power uses.

Therefore, in order to resolve the above problems, an electric power generating apparatus using a wave force was introduced in Korean Patent Serial Number 35,913 which was invented by the inventor of this invention.

The Korean Patent Serial Number 35,913 is basically directed to converting the force generated by a lifting/lowering buoy in response to waves applied thereto into a rotation force using a chain and a sprocket and then driving a power generator.

The above-mentioned method can be achieved even at sea having even and calm waves. Namely, it is possible to generate a desired electric power at sea having even and calm waves in which waves having a height of more than 1 meter are present, so that it is easy to decide a proper place in which to install the apparatus of the prior art "Korean Patent Serial Number 35,913" at sea. In addition to that, since the apparatus is installed at sea accounting for 78% of the entire surface area of the Earth, the surface area is not reduced, and it is easy to select the construction site of the system, compared to when installing the electric power generating system at land.

However, in the above-mentioned method, the bottom center portion of the buoy is connected to one end of a fixing wire rope connected to the upper portion of the rotation support of the frame provided on the sea level, the driving wire of which its one end is fixed to the bottom center portion of the same is connected to the end portion of a chain driving the electric power generator, and a balance weight is fixed to the other end of the chain, so that the shaft of the electric power generator is rotated in cooperation with the one-directional clutch when the buoy is lifted in response to waves applied thereto, and the shaft of the electric power generator is not rotatable in cooperation with the one-directional clutch when the buoy is lowered in response thereto, and thus the electric power generator is intermittently driven, whereby it is difficult to obtain a desired electric power.

In addition, in the above-mentioned apparatus, it is ideal to slightly lift the buoy toward the fixing wire lope with respect to the waves flowing from the fixing wire lope to the buoy; however, since the upper portion of the rotation support is submerged into sea, and the bottom center portion of the buoy is fixed to the end portion of the fixing wire fixed to the upper portion of the rotation support, when waves are strongly applied to the apparatus, the buoy is tilted at an angle of 45°, and the buoy is applied with very strong waves. Therefore, the buoy may be escaped from the fixing wire rope, or the fixing wire rope may be broken. In addition, the apparatus may be damaged due to a strong force applied to the rotation support and the frame.

Since the ends of the fixing wire rope and the driving wire rope are fixed to the bottom center portion of the buoy, and the upper portion of the rotation support is submerged into sea, in case that waves are flown from the fixing wire rope to the buoy, one side of the buoy toward which waves are applied can be easily lifted. In this case, the wave force applied thereto in the horizontal direction is stronger than the force lifting the buoy upwardly, and the force pushing the buoy in the horizontal direction is stronger than the force which is needed to drive the electric power generator.

In addition, in case that waves are flown from the wire rope to the buoy, a desired electric power can be generated; however, when waves are applied to the side of the buoy or to the buoy from the front side to the wire rope, the buoy can not be responsive to the moving direction of the waves in response to waves applied thereto, so that the wire rope becomes loosened, and the electric power generator is not driven, and thus the electric power generation efficiency becomes lowered.

Moreover, the fixing wire rope which supports the buoy and the driving wire rope to which the balance weight is fixed may become entangled.

Meanwhile, the frame of the above-mentioned electric power generation apparatus should be provided with a certain facility for transforming and transmitting the generated electric power and for controlling and maintaining the facility; however, since the entire structure of the frame is connected to the wires connected to an anchor block fixed to a predetermined portion of the sea bed, the frame can not be effectively moored to a predetermined portion of the sea bed when big waves are applied thereto. Namely, in this case, the frame becomes unstable in the sea, thus causing frame breakage or the facilities breakage mounted at the frame. More, seriously, the frame may be lost.

In addition, since the electric power generator or related facilities for generating rotation force is disposed within the sea at about 10 m, it is very difficult to properly maintain the facilities.

SUMMARY OF THE INVENTION

Accordingly, it is an object of the present invention to provide an electric power generating apparatus using a wave force and a method thereof, which overcome the problems encountered in a conventional electric power generating apparatus using a wave force.

It is another object of the present invention to provide an improved electric power generating apparatus using a wave force and a method thereof which are capable of maximizing the efficiency of the power generation by driving a compressed liquid generation unit such as the liquid pump, a hydraulic pump, and the like with respect to each buoy using a force generated by the lifting/lowering movement of a buoy in response to waves applied thereto, gathering the compressed liquid obtained by each compressed liquid generation unit, and driving a turbine of the power generator by using the gathered compressed liquid, thus generating constantly electric power.

It is another object of the present invention to provide an improved electric power generation apparatus using a wave force and a method thereof which are capable of achieving an optimum state for converting the wave force into the lifting/lowering movement as the buoy becomes responsive to waves applied thereto in accordance with the forwarding direction of the waves, and effectively converting the wave force into a desired force, thus preventing damage or loss of the buoy.

It is another object of the present invention to provide an improved electric power generation apparatus using a wave force and a method thereof which are capable of easily achieving a desired object by preventing an entanglement of a wire rope and the like which support the buoy.

It is another object of the present invention to provide an improved electric power generation apparatus using a wave force and a method thereof which are capable of preventing damages, breakage and the like of the turbine and paths when the pressure of the compressed liquid, which is generated by the compressed liquid generation unit driven by the buoy, exceeds a predetermined level.

It is another object of the present invention to provide an improved electric power generation apparatus using a wave force and a method thereof which are capable of easily maintaining the system by providing at the buoy floated on the sea level a rotation generation unit for converting the lifting/lowering movement of the buoy into the rotation force and a compressed liquid generation unit driven by the rotation force generation unit for generating the compressed liquid.

It is another object of the present invention to provide an improved electric power generation apparatus using a wave force and a method thereof which are capable of protecting the system from waves having a predetermined height higher than the previously set height based on the climate condition at the construction site of the system.

To achieve the above objects, there is provided an electric power generating method using a wave force, which includes the steps of lifting/lowering a plurality of buoys in response to waves applied thereto, each of said buoys being connected to each of a plurality of support members disposed at a lattice-type frame submerged within sea; converting the lifting/lowering movement of each buoy into a rotation force; a driving compressed liquid generation unit provided at each buoy in cooperation with the rotation force; transferring the compressed liquid generated in the operation of the compressed liquid generation unit to a main transferring tube; driving a turbine using the compressed liquid transferred thereto through the main transferring tube; and generating power by driving a power generator drivingly communicating with the turbine.

The transmission of the compressed liquid generated by each compressed liquid generation unit to the main transferring tube is performed through the first gathering transferring tube connected to the transferring hose and a plurality of transferring hoses, and the second gathering transferring tube to which a plurality of gathering transferring tubes are connected.

When the pressure of the compressed liquid in the transferring step exceeds a predetermined level, the pressure is lowered as the spill value is automatically opened, and when the pressure of the same becomes lower than a predetermined level, the normal transmission is achieved as the governor spill value is automatically closed.

When a very high pressure which is difficult for the spill value to detect is applied thereto in the transferring step, the serge unit becomes activated so as to prevent the damages, the breakage of the system, and the like.

To achieve the above objects, there is provided an electric power generating apparatus using a wave force, which includes a frame having a central power generation sector S1 disposed at a predetermined depth of the sea within a predetermined area of the construction site of the apparatus, and a plurality of compressed liquid generation sectors S2 spaced-apart by a predetermined distance with respect to the central power generation sector S1; a support unit for movably supporting the frame at the sea; a rotation unit disposed at the compressed liquid generation sector S2 of the frame, a predetermined portion of the same being protruded beyond the sea level; lifting/lowering support unit connected to the upper portion of the rotation unit; a plurality of buoys connected to each of the end portions of the lifting/lowering support unit; a rotation force generation unit disposed at each of the buoys for converting the lifting/lowering movement into a rotation force; a compressed liquid generation unit disposed at an upper surface of each buoy; a one-directional driving unit for transferring one-directional force of the rotation force generation unit to the compressed liquid generation unit; a compressed liquid generation unit for transferring the compressed liquid discharged from the compressed liquid generation unit to the power generation sector S1; a turbine T disposed at the power generation sector S1 for generating a driving force necessary for the power generation in cooperation with the compressed liquid transferred from the compressed liquid transferring unit; and a power generator F driven by the turbine T.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7A through 7D are views showing the connection structure between the anchor block and the anchor rope according to the present invention, of which:

FIG. 7A is a partial side view showing the anchor block;

FIG. 7B is a bottom view showing the anchor block;

FIG. 7C is a partial side view showing the frame to which the anchor rope is connected; and FIG. 7D is a partial bottom view showing the frame to which the anchor rope is connected;

FIGS. 8A through 8C are views showing an assembled state between a rotation unit, a lifting/lowering support unit, and a buoy according to the present invention, of which:

FIG. 8A is a perspective view showing the same;

FIG. 8B is a side view showing the same; and

FIG. 8C is a plan view showing the same;

FIGS. 9A and 9B are views so as to explain the operation state of the buoy, of which:

FIG. 9A is a side view showing a relationship between the buoy and the sea level; and FIG. 9B is a schematic view showing that a horizontal wave force serves as a predetermined force for lifting the buoy according to the present invention;

FIGS. 12A through 12D are views showing a lifting/lowering unit, of which:

FIG. 12A is a schematic plan view showing the connection structure between the wire rope, the connection rod, and the buoy;

FIG. 12B is an enlarged view of the "B" portion of FIG. 12A;

FIG. 12C is a side view of FIG. 12B; and

FIG. 12D is a plan view of FIG. 12C;

FIGS. 13A through 13E are views showing the buoy, the rotation force generation unit, one-directional driving unit, and the compressed liquid generation unit according to the present invention, of which:

FIG. 13A is a partially cutaway cross-sectional view showing the same;

FIG. 13B is a vertical cross-sectional view showing the same;

FIG. 13C is a cross-sectional view showing the rotation generation unit and the one-directional driving unit;

FIG. 13D is a vertical cross-sectional side view showing a winding start safety fixing structure of a driving wire rope with respect to the rotation drum; and FIG. 13E is a cross-sectional view taken along the line XIIIe—XIIIe;

FIG. 14 is a plan arrangement view of a compressed liquid transferring unit according to the present invention;

FIGS. 15A and 15B are views showing a gathering transferring tube of a compressed liquid transferring unit, a main transferring tube, and a surge tank according to the present invention, of which:

FIG. 15A is a plan view showing the same; and

FIG. 15B is a cross-sectional side view showing the same;

FIGS. 16A and 16B are views showing the construction of the surge tank, of which:

FIG. 16A is a horizontal cross-sectional view showing the same; and

FIG. 16B is a cross-sectional view taken along the line XVIb—XVIb of FIG. 16A;

FIGS. 17A through 17D are views showing the construction of a governor spill valve according to the present invention; of which:

FIG. 17A is a vertical cross-sectional view showing the same;

FIG. 17B is a cross-sectional view taken along the line XVIIb—XVIIb of FIG. 17A;

FIG. 17C is a front view showing the same; and

FIG. 17D is a perspective view showing the arrangement of an attaching unit;

FIGS. 18A through 18C are views showing the structure of the power generation sector, and the arrangement structure of a turbine and power generator, of which:

FIG. 18A is a plan view showing the same;

FIG. 18B is a vertical side cross-sectional view showing the same; and

FIG. 18C is a vertical cross-sectional front view showing the same; and

FIG. 19 is a schematic plan view showing another embodiment of the present invention.

DETAILED DESCRIPTION OF THE INVENTION

The electric power generating apparatus using a wave force and a method thereof according to the present invention will now be explained with reference to the accompanying drawings.

Figure 1:
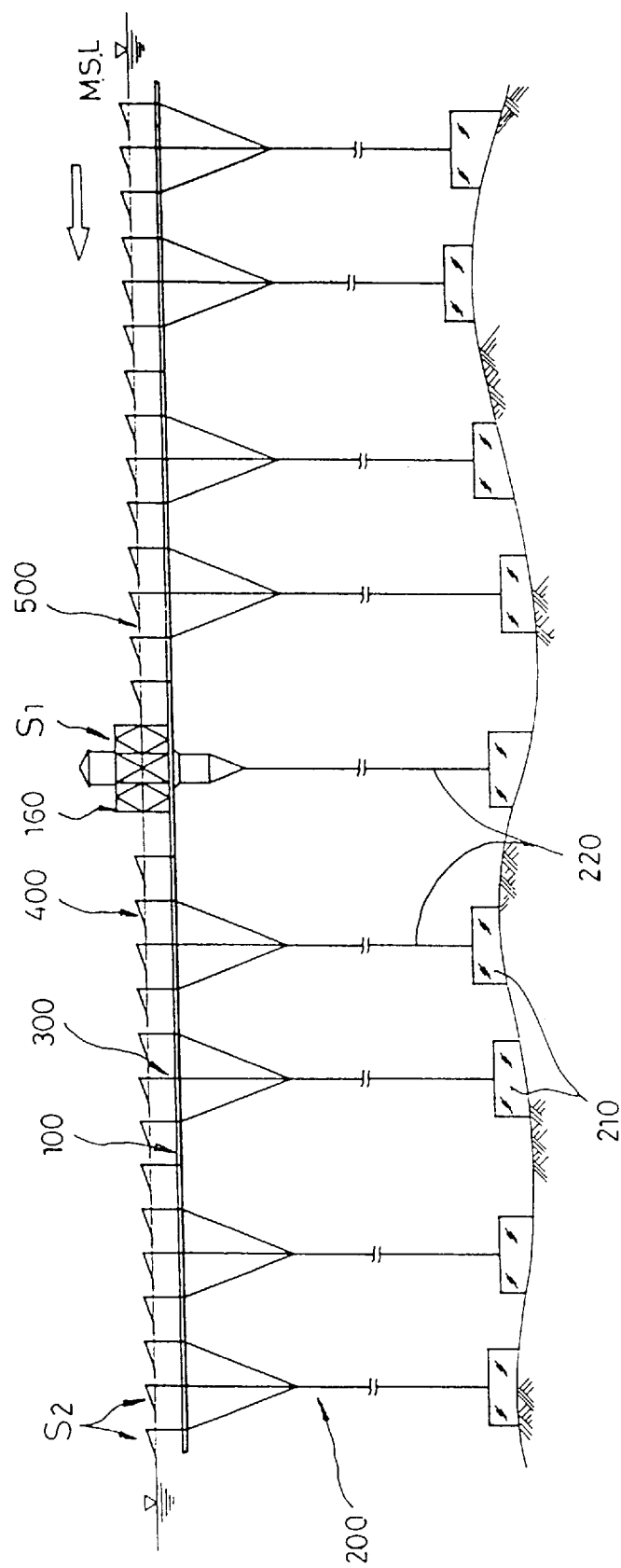
FIG. 1 is a schematic side view showing the entire construction of an electric power generating apparatus using a wave force according to the present invention.

FIG. 1 shows the entire construction of an apparatus for implementing an electric power generating apparatus using wave force, which includes a lattice-like frame 100 provided with a plurality of compressed liquid generating sectors S2 spaced-apart about an electric power generating sector S1 and being movable within a predetermined range at sea, a frame mooring unit 200 for mooring the frame 100 at a predetermined depth within sea, a plurality of rotation units 300 mounted at the compressed liquid generating sector S2 of the frame 100, and of which its one end is protruded beyond the sea surface, a lifting/lowering support unit 400 connected to the upper portion of the rotation unit 300, a buoy 500 connected to the end of the lifting/lowering support unit 400 and lifting/lowering in response to the movement of waves, a rotation force generating unit 600 disposed at the buoy 500 for converting a lifting/lowering force of the buoy into a rotation force, a compressed liquid generating unit 700 disposed at the upper surface of the buoy 500, a one-directional driving unit 800 for transferring only one-directional force of the rotation force generating unit 600 to the compressed liquid generating unit 700, a compressed liquid transferring unit 900 for transferring a compressed liquid discharged from the compressed liquid generating unit 700 to the electric power generating sector S1, a turbine T disposed at the electric power generating unit S1 for generating a predetermined driving force necessary for generating electric power in cooperation with the compressed liquid transferred thereto from the compressed liquid transferring unit 900, and an electric power generator G driven by the turbine T.

Figure 2:
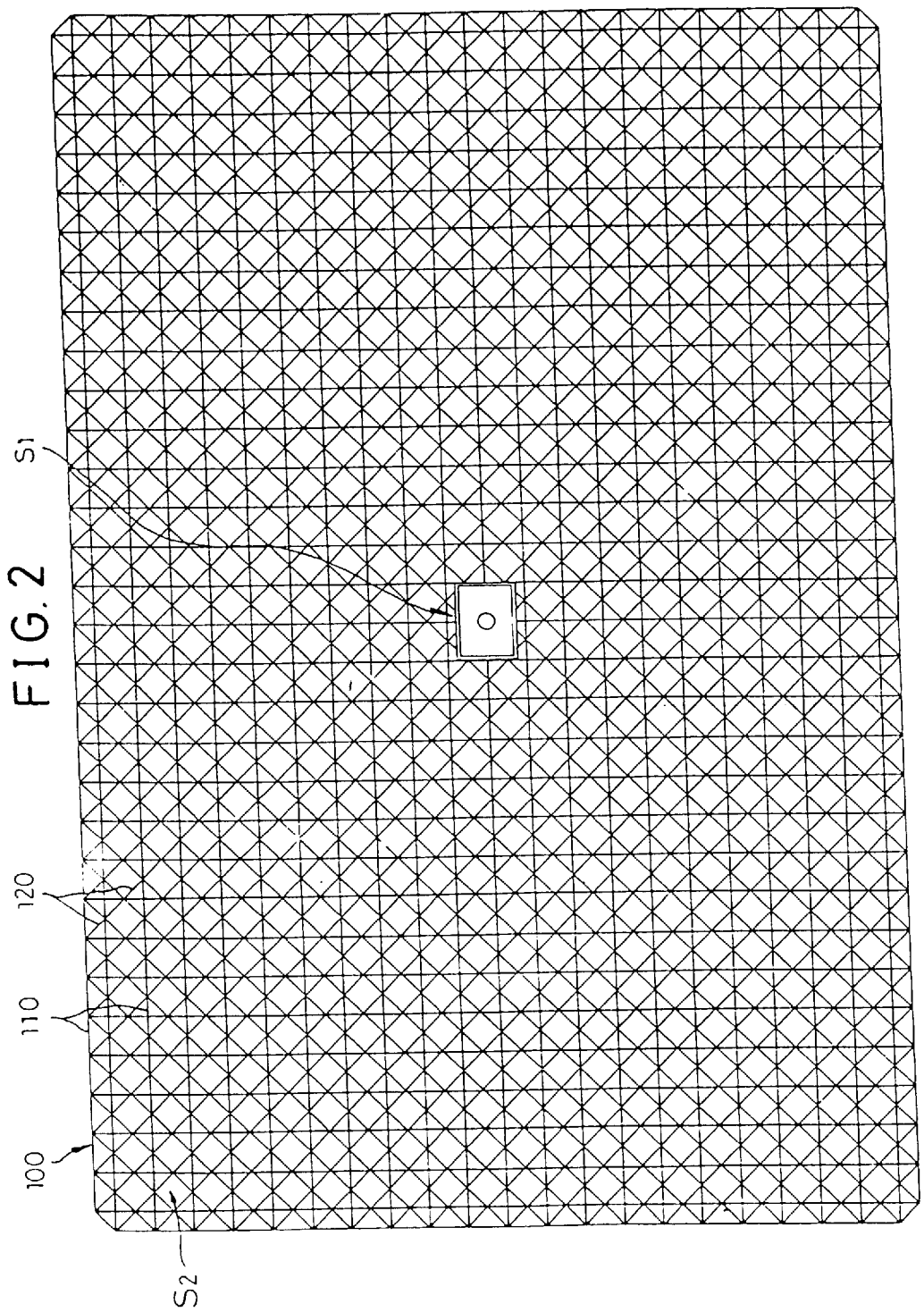
FIG. 2 is a schematic plan view showing a frame construction according to the present invention.
Figure 3:
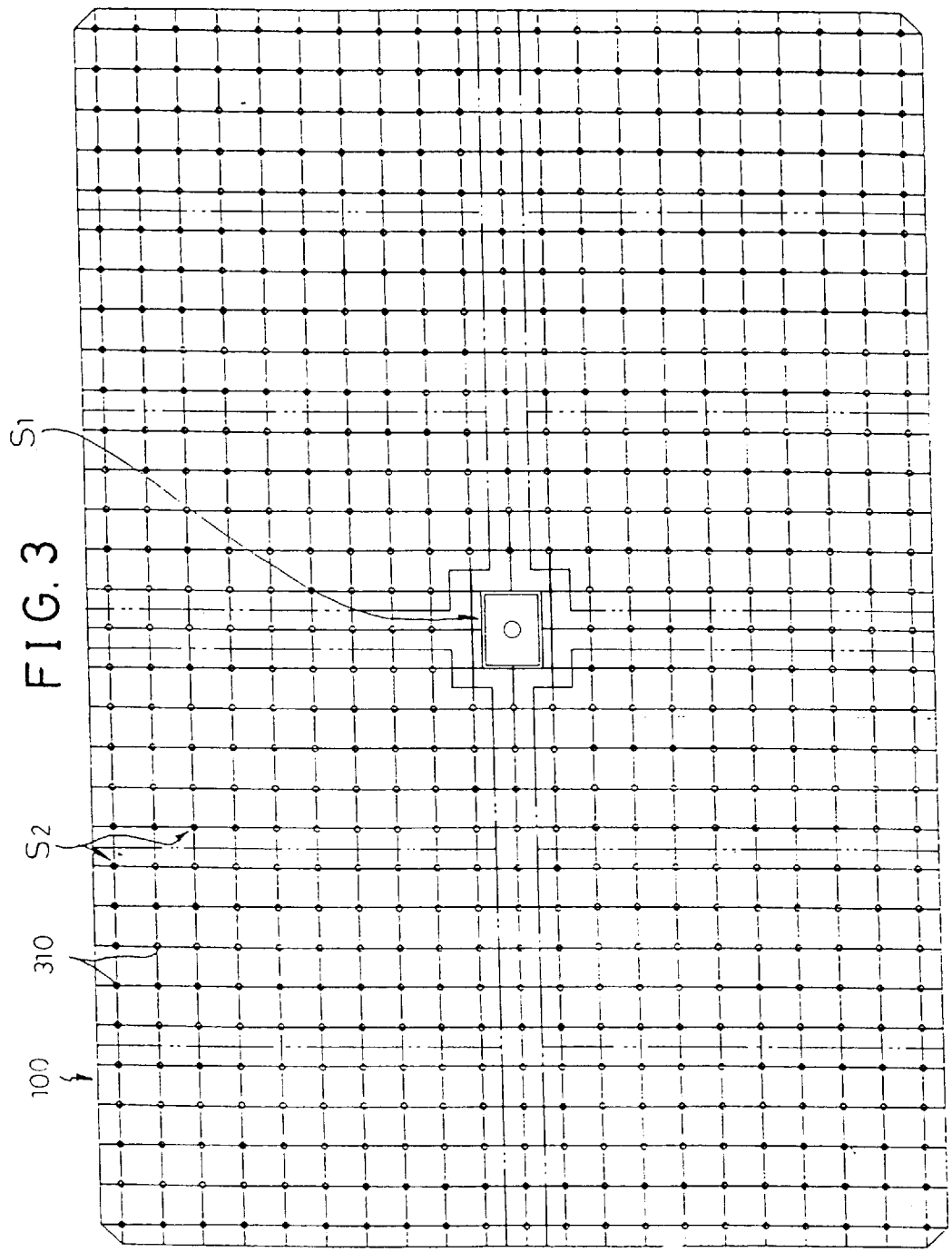
FIG. 3 is a schematic plan view showing the rotation center of a rotation unit according to the present invention.
Figure 4:
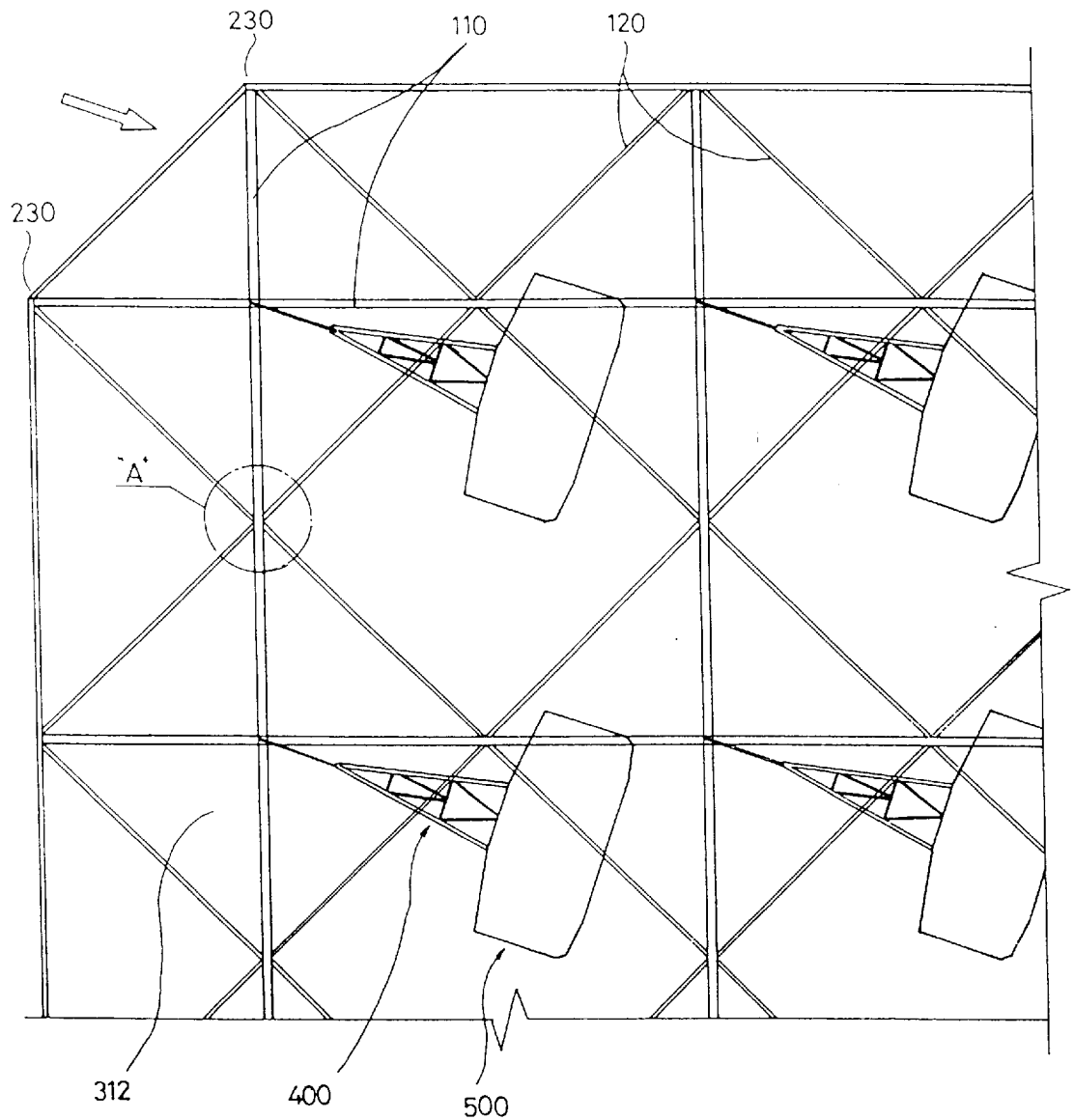
FIG. 4 is a partially enlarged plan view showing an electric power generating apparatus using a wave force according to the present invention.

As shown in FIG. 3, the electric power generating sector S1 of the frame 100 is provided with offices and lodging facilities for people who controls the turbine T, the electric power generator G, and the like, and the compressed liquid generating sector S2 is provided with the rotation unit 300, the lifting/lowering support unit 400, the buoy 500, and the like so as to generate a compressed liquid. As shown in FIGS. 2 through 4, a frame main member 110, mainly made of a hollow tube body or the like, is arranged in a grid shape, and the frame main members 110 are connected to each other by a reinforcing member 120.

In this embodiment, the reinforcing member 120 is preferably made of a tie rod; however, the material thereof is not limited thereto. That is, the construction of a predetermined shaped member or the hollow tube body can be welded, threadably engaged, or connected by a rivet-shaped member.

Figure 5:
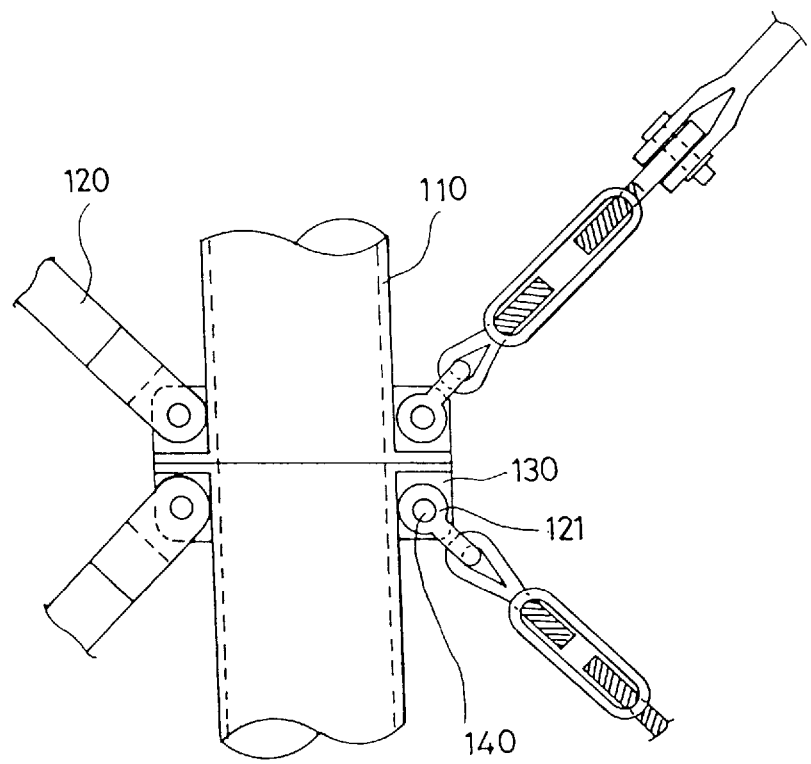
FIG. 5 is a partial plan view of the "A" portion of FIG. 4 according to the present invention.

When the tie rod is used as the reinforcing member 120, as shown in FIGS. 4 and 5, a bracket 130 is fixed to a cross point of the frame main member 110, and each of connection portions 121 formed at each end of the reinforcing member 120 is connected at four corners of the bracket 130 using a fixing member 140.

In addition, an auxiliary frame 160 is extended beyond the upper surface of the frame 100 so as to mount the turbine T and the electric power generator G at the electric power generator S1 of the frame 100 as shown in FIG. 1.

Figure 15A:
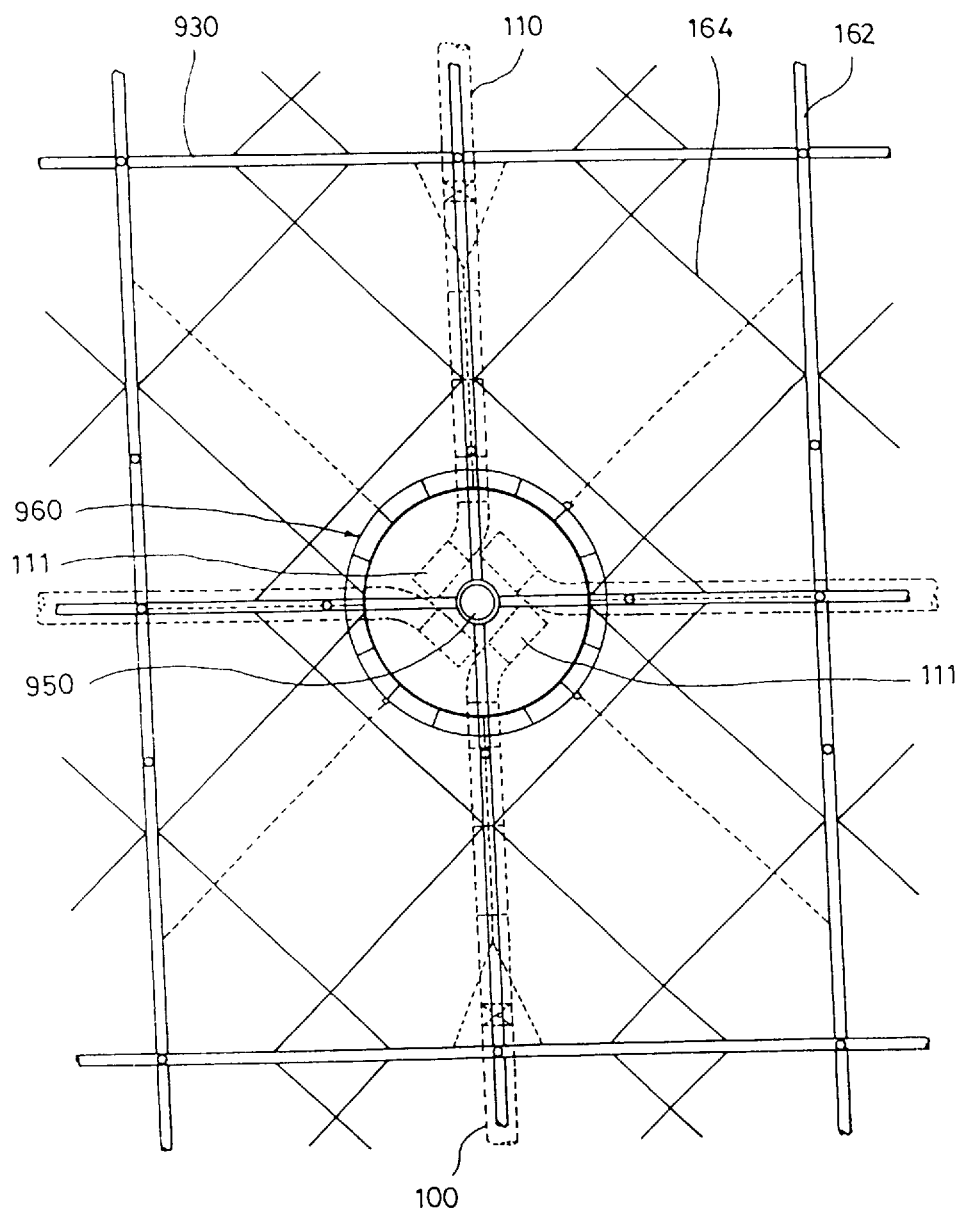
Figure 15B:
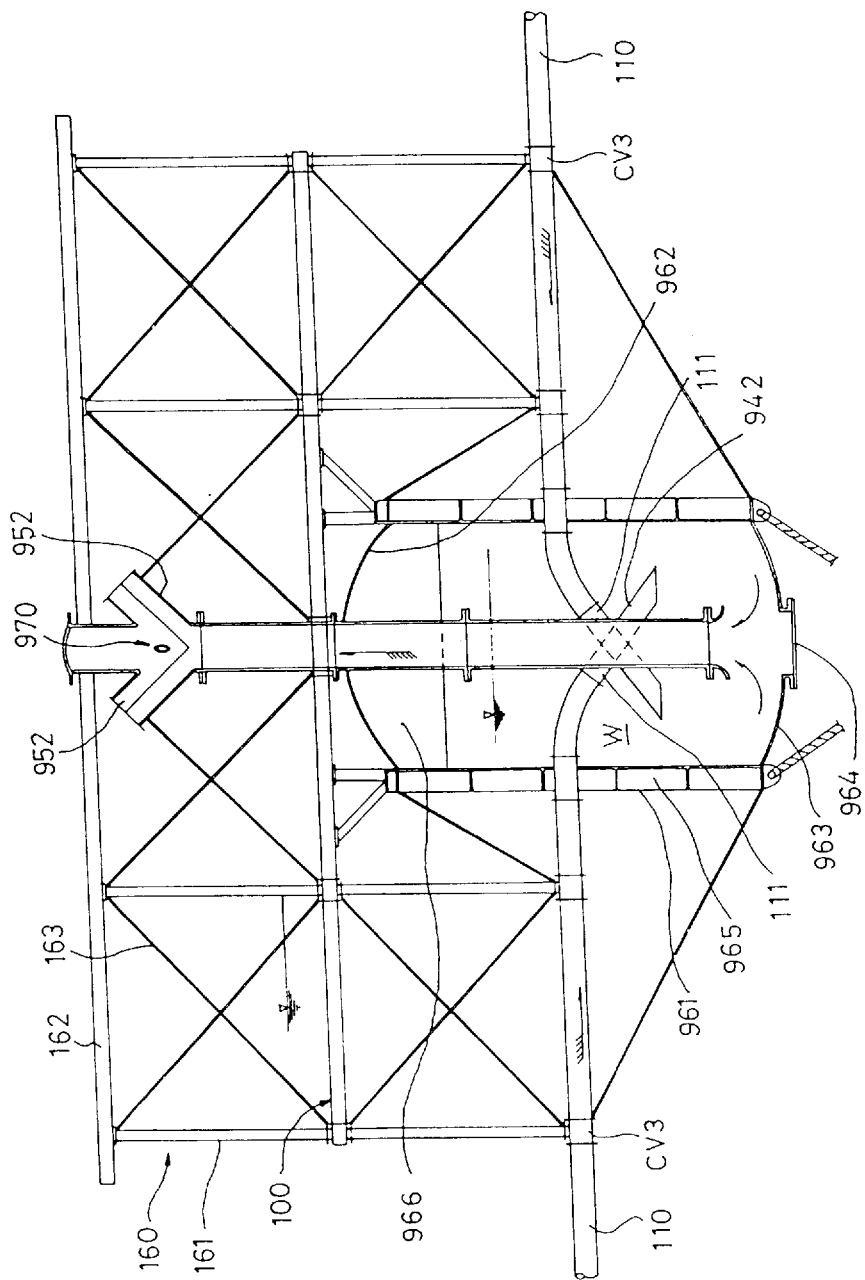

The auxiliary frame 160, as shown in FIGS. 1 and 15A and 15B, is constructed by vertically mounting a plurality of supports 161 at the electric power generator S1 of the frame and a rectangular upper frame 162, made of an H-beam, at the upper portion thereof. Here, the supports 161 are supported by the reinforcing members 163. The upper frames 162 are supported by the reinforcing members 164.

The reinforcing member 163 of the supports 161 are made of a predetermined shaped steel. However, it may be made by welding the members or of screws or rivets, The upper frame 162 is preferably connected with the reinforcing member 120 of the frame using a toe rod.

Figure 6:
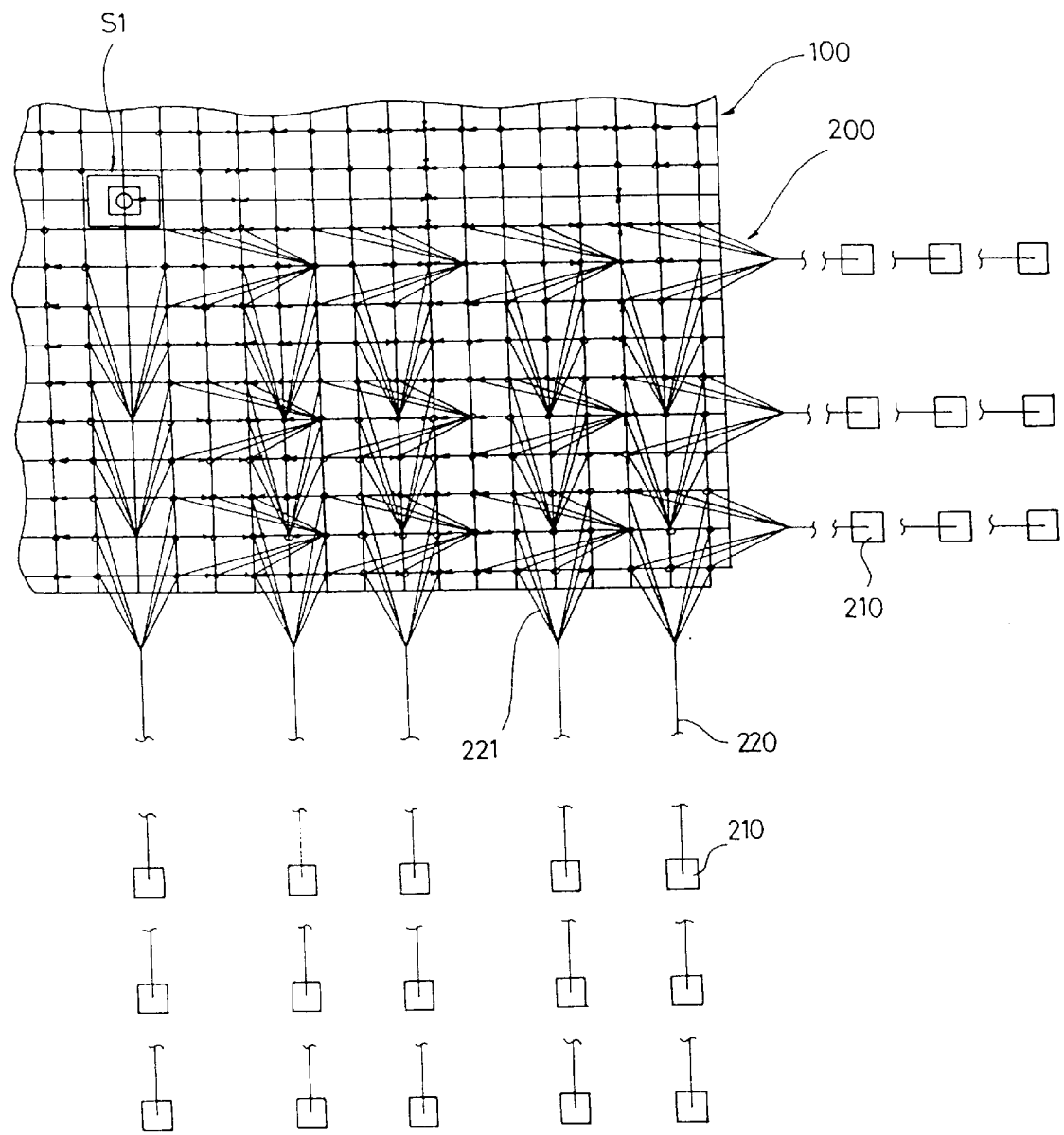
FIG. 6 is a schematic view showing a frame support unit according to the present invention.

As shown in FIG. 6, the frame mooring unit 200 includes a plurality of anchor blocks 210 anchored to the sea bed, and an anchor rope 220 for connecting the frame 100 and each anchor block 210.

The anchor block 210 is made of concrete blocks, and the lower portion of the anchor rope 220 is connected to the upper portion of the anchor block 210 as shown in FIG. 6, and a plurality of the branched ropes 221 (in this embodiment, six ropes are preferably used) connected to the upper portion of the anchor rope 220 is connected to the frame 100, so that the frame 100 can be horizontally maintained.

Figure 7A:
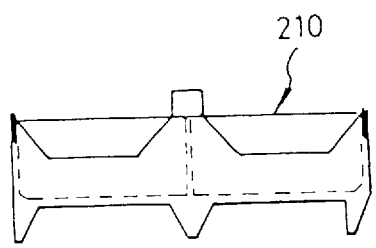
Figure 7B:
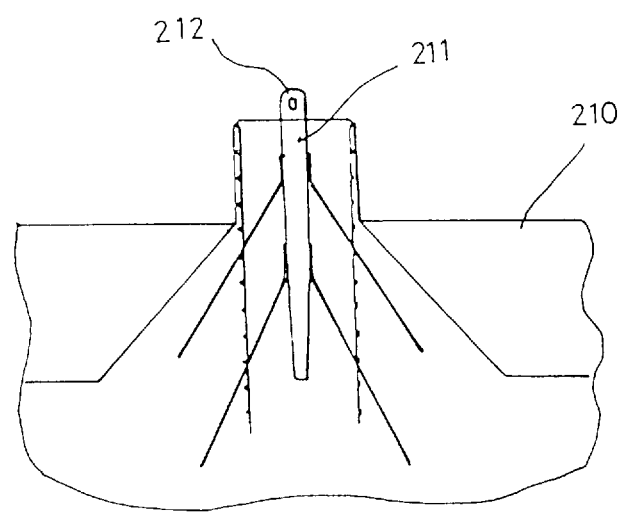
Figure 7C:
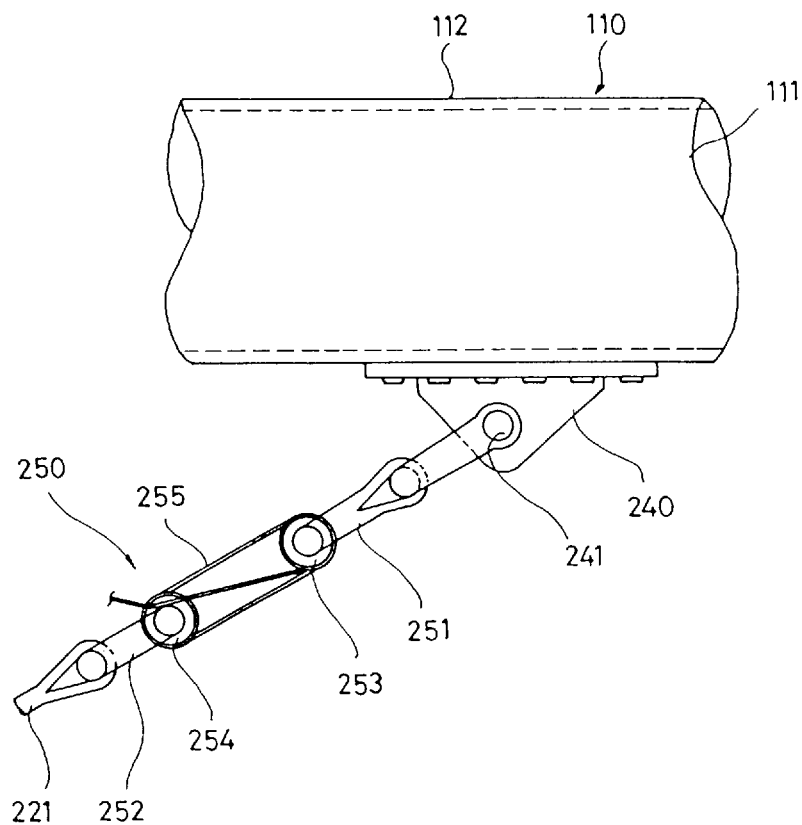
Figure 7D:
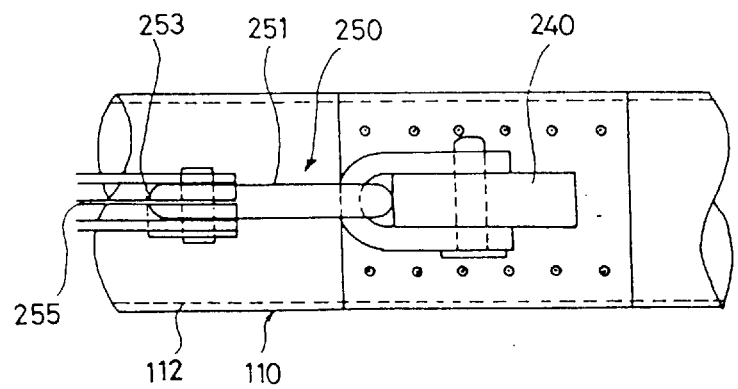

As shown in FIGS. 6 and 7A and 7B, an anchor pin 211 is provided at each anchor block 210, and an anchor ring 212 is protruded at the center portion of the same for a connection with the lower portion of the anchor rope 220, and an anchor connection plate 240 is fixed to the lower portion of the frame 100 for a connection with the upper portion of the branched rope 221 as shown in FIGS. 7C and 7D, and a connection opening 241 is formed at the anchor connection plate 240.

As shown in FIG. 6, six branched ropes 221 are connected to each anchor rope 220; however, it is not limited thereto. The number of the same is determined based on the total weight applied to the frame 100.

In addition, as shown in FIGS. 7C and 7D, the anchor connection plate 240 attached to the lower portion of the frame 100 and the upper portion of the branched rope 221 are connected by a tension adjusting member 250, thus adjusting a tension of the anchor rope 220, so that tension applied to each anchor rope 220 becomes even.

As shown in FIGS. 7C and 7D, the tension adjusting member 250 includes connection rings 251 and 252 in which rollers 253 and 254 are provided at each end thereof. A tightening wire rope 255 is wound between the rollers 253 and 254, so that the tension applied to the anchor rope 220 is adjusted by a predetermined tension of the tightening wire rope 255, and the end of the tightening wire rope 255 is fixed to the connection rings 251 and 252 for maintaining a predetermined tension therebetween.

The tension adjusting member 250 and a tension gage (not shown) are used for adjusting a tension, so that a tension applied to the anchor ropes 220 and the branched rope 221 can be even.

In addition, the diameter and the number of wounding of the tightening wire rope 255 are determined based on the tension force applied to each anchor rope 220. For example, when the weight applied to each anchor rope 220 is 6 tons, and when six branched ropes 221 are connected to each anchor ropes 220, and when the tension force applied to the branched ropes 221 is about 1 ton, here the tension force is different in accordance with an installation angle of the branched rope 221, the tightening wire rope 221 having a safety tension strength of 200 Kg is wound three(3) times, the tightening wire rope 221 becomes six(6) wires, so that the tightening wire rope 221 can resist up to 1 ton.

In this embodiment, the anchor block 210 is placed at the sea bed, and the anchor block 210 and the frame 100 are connected by the anchor rope 220. In accordance with the condition of the sea surface or the sea bed, anchor rods can be stricken and partially planted into the sea bed for mooring the frame 100 using the anchor rope 220.

Figure 8A:
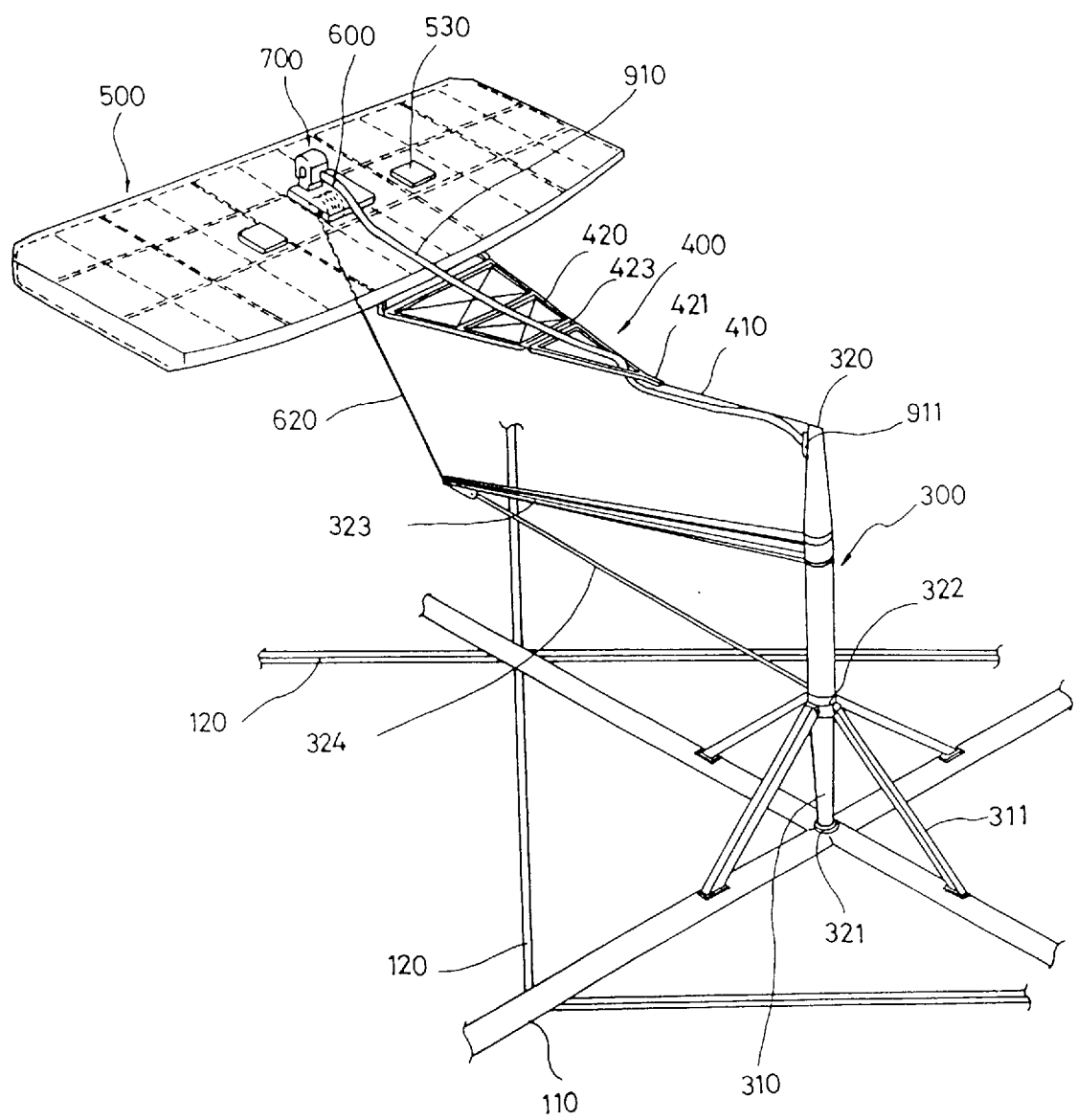
Figure 8B:
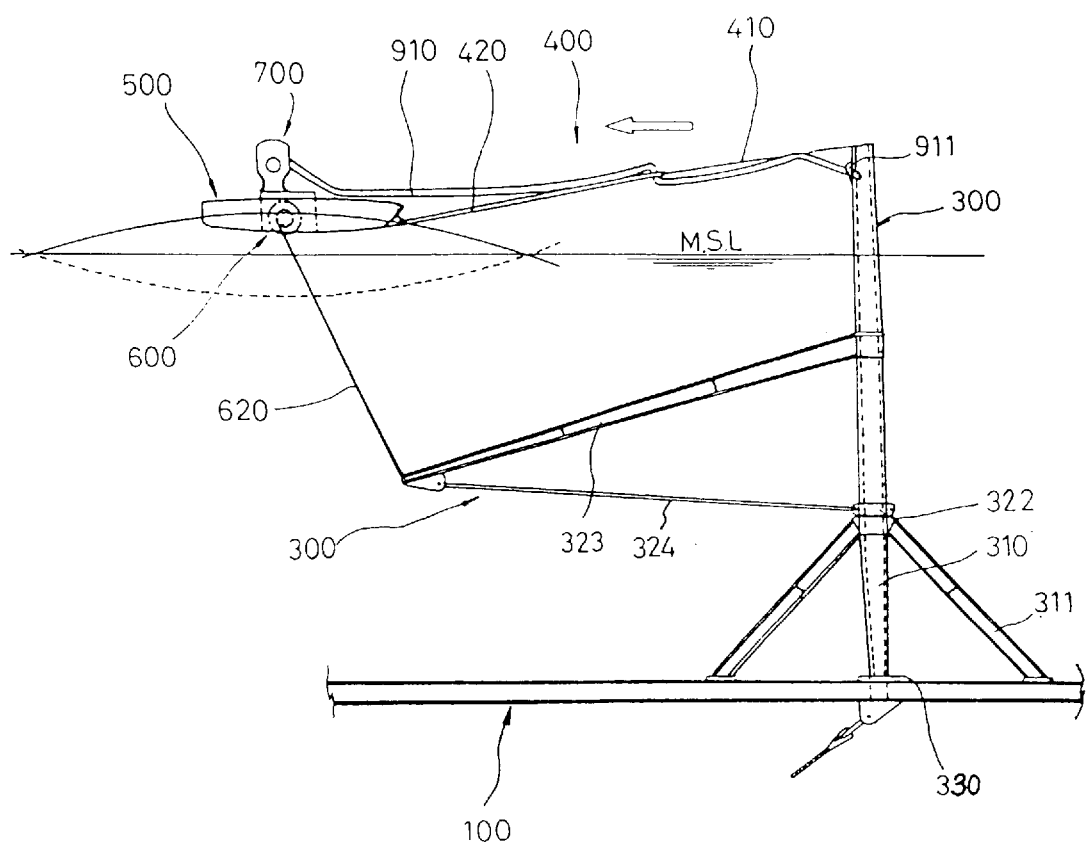
Figure 8C:
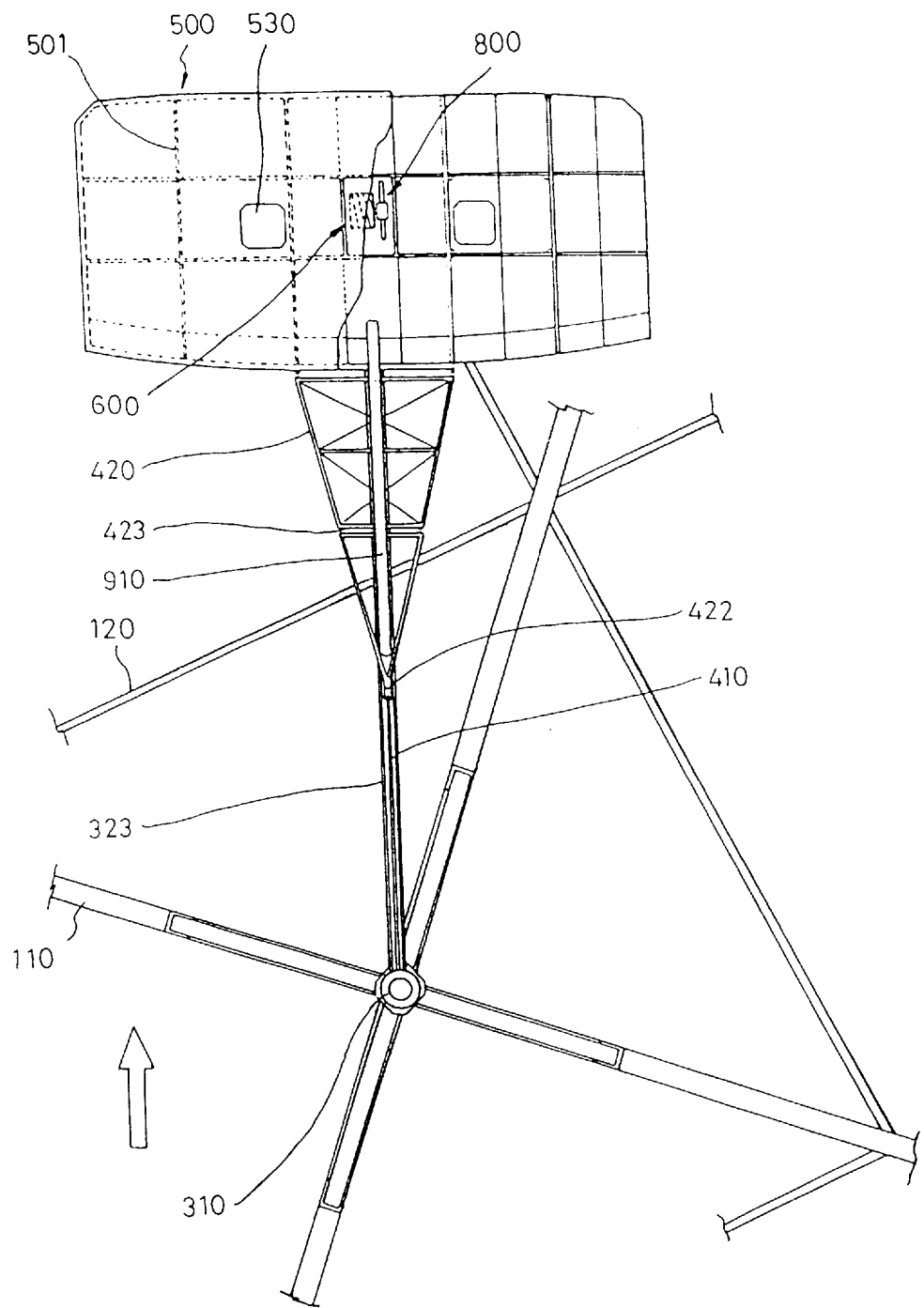

As shown in FIGS. 8A, 8B, and 8C, the rotation unit 300 is provided with a support member 310 which is vertically and rotatably mounted at the compressed liquid generating sector S2.

The support member 310, which is supported at the frame 100 by a reinforcing support member 311, includes a hollow tube body 312 which is a hollow shaft having a streamline shaped cross section and is used as a transferring path of the compressed liquid, and a streamline portion 313 which is integral with the hollow tube body 312 and has a triangle-shaped cross section so as to reduce the contact resistance with the sea water.

The support member 310 is mounted at the cross of the frame main member 110 of the frame 100, and the intermediate portion and the lower portion of the same are rotatably supported at the cross of the frame main member 110 of the reinforcing support member 311 by the rotation ring members 321 and 322, and an arm member 323 which is downwardly extended within the sea and is rotatable together with the support member 310.

Figure 10:
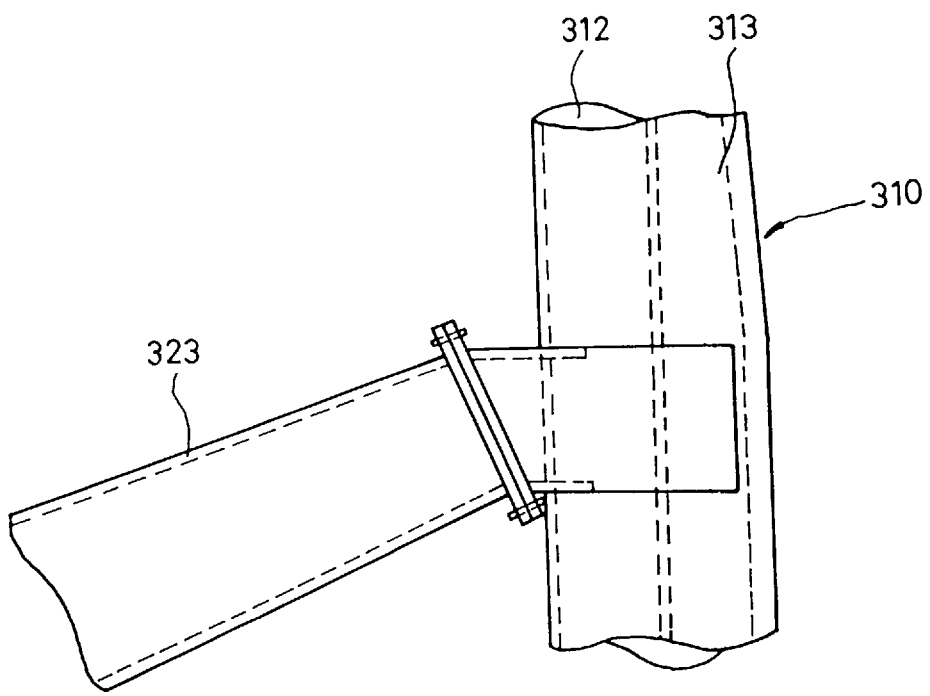
FIG. 10 is a side view showing the connection structure of an upper side of the rotation unit with respect to the support member according to the present invention.

The arm member 323 is fixed to have a downwardly inclined angle by the flange engagement using bolts and nuts at a predetermined portion of the support member 310 as shown in FIG. 10.

Figure 11:
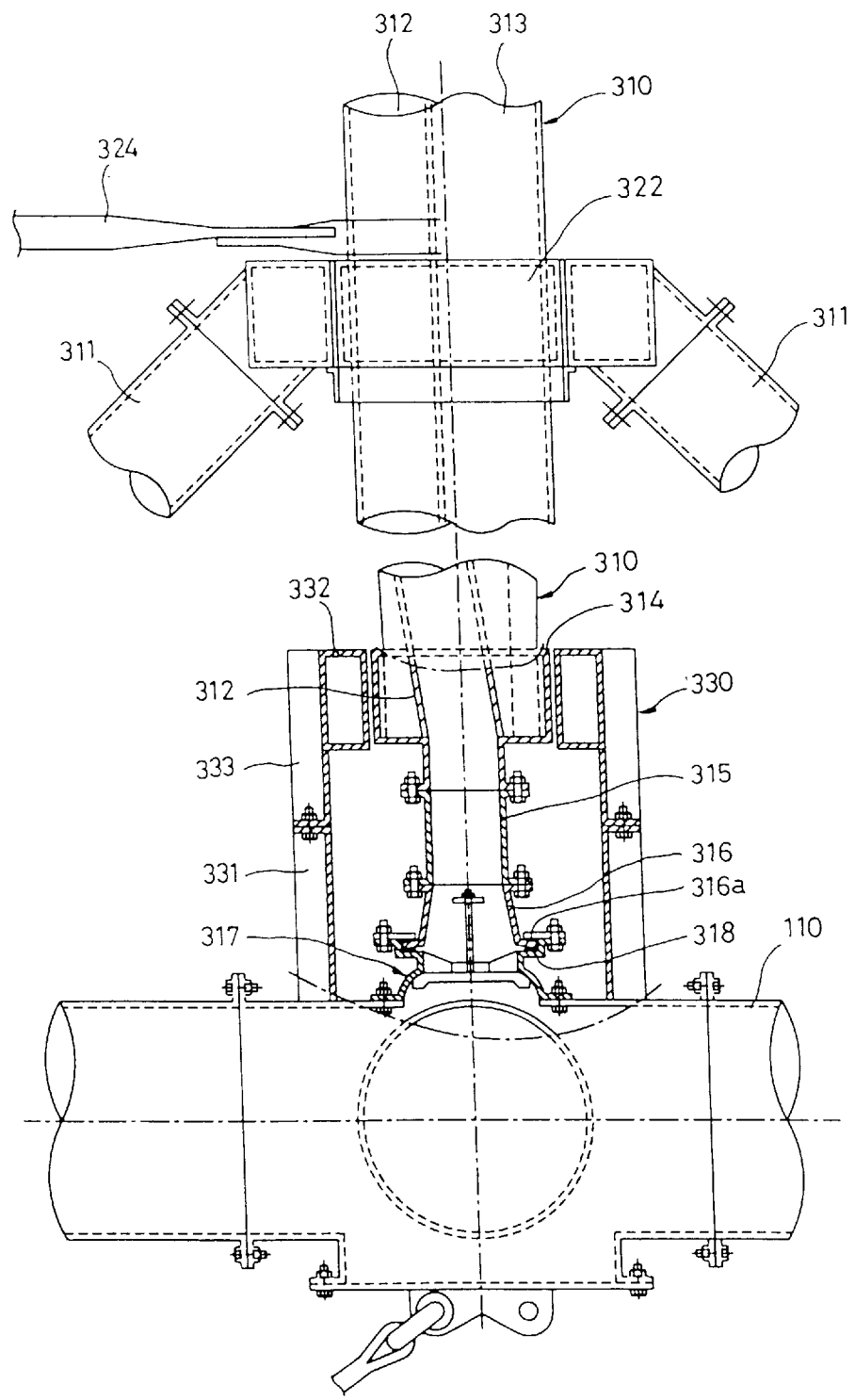
FIG. 11 is a side view showing the connection structure of a lower side of the rotation unit with respect to the support member according to the present invention.

The arm member 323 which is rotatable with the support member 310, as shown in FIG. 11, is supported by a tie rod 324 of which its one end is fixed to the support member 310 contacting with the rotation point of the support member 310, namely, with the upper rotation ring member 322 and its other end is fixed to the end portion of the arm member 323.

In addition, the lower portion of the support member 310, as shown in FIG. 11, is rotatably supported by a lower rotation ring member 330 fixed to the cross of the frame main member 110 of the frame 100. The lower rotation ring member 330 includes a lower member 331 fixed to the frame main member 110 of the frame 100, a rotation ring 332 disposed at the upper inner surface of the same, and an upper member 333 engaged with the lower member 331.

The cylindrical ring member 314 is fixed at the lower outer end of the support member 310, so that when the support member 310 is rotated, it is guided and supported by the rotation ring 332 of the upper member 333. In addition, a rubber pipe 315 is connected to the lower end of the ring member 314 so as to absorb the impact which occurs during the rotation of the support member 310, and a hinge pipe 316 having a flange portion 316a at its lower portion is connected to the rubber pipe 315.

In addition, a check valve 317 is disposed at the cross of the frame main member 110 of the frame 100 in order for the compressed liquid introduced into the frame main member 110 not to be reversely flown through the hollow tube body 312 of the support member 310, and the check valve 317 is engaged with the flange portion 316a of the hinge pipe 316 in cooperation with a rubber ring 318, thus achieving a desired rotation and tight pealing of the support member 310.

The upper portion of the support member 310 is preferably protruded beyond the sea surface by about 2 m when the height of wave is 10 m, and the frame 100 is disposed at a depth of 11 m within sea. However, the above-mentioned condition is not limited thereto. That is, it may be adjusted in accordance with the condition of the construction site.

The lifting/lowering support unit 400, as shown in FIGS. 8A through 8C and FIGS. 12A, 12B, 12C, and 12D, includes a wire rope 410 connected to the upper portion of the rotation unit 300, that is, to the upper portion of a post member 326, and a connection rod 420 connected to the end of the wire rope 410.

Figure 12A:
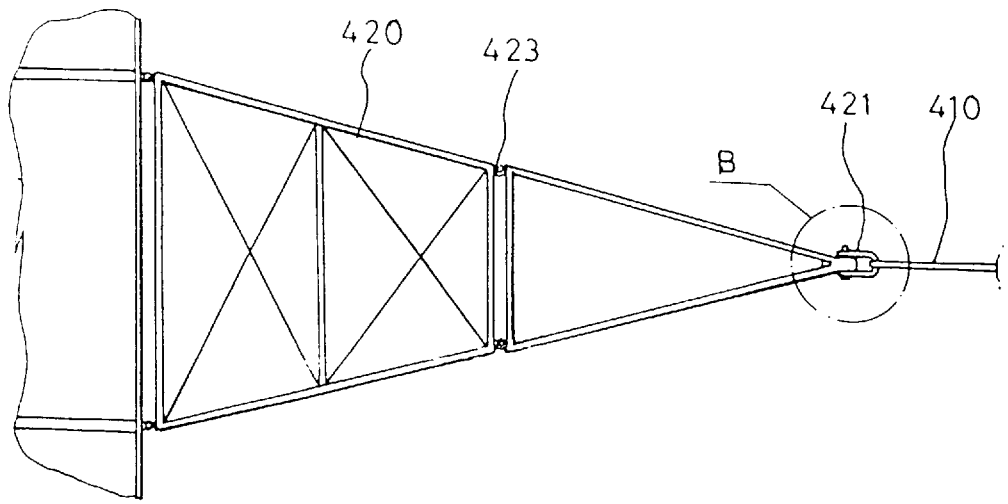
Figure 12B:
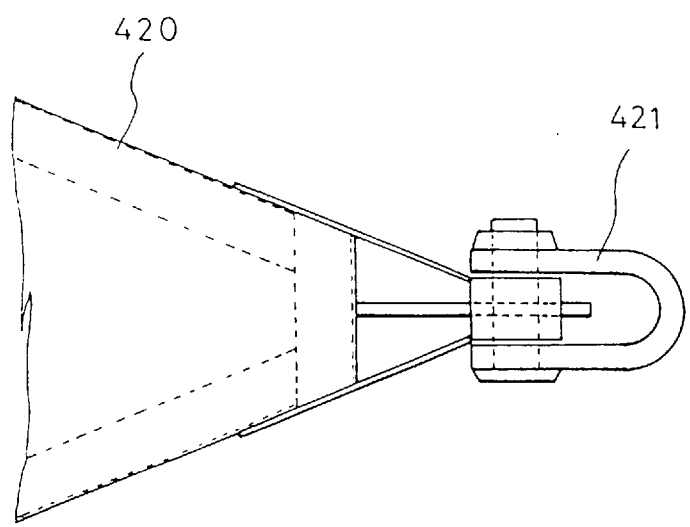
Figure 12C:
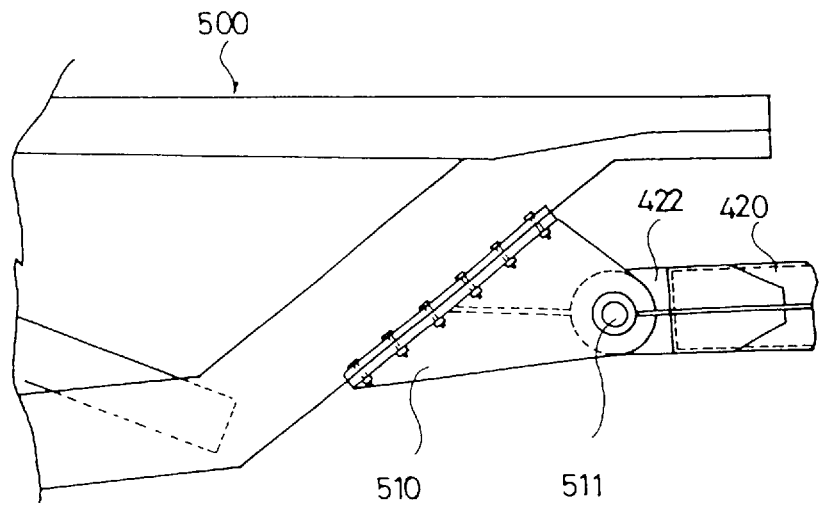
Figure 12D:
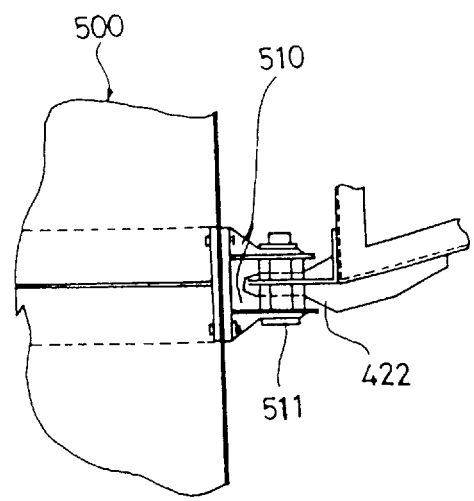

The connection rod 420 is formed as a triangle-shaped steel structure in which its rear portion connected to the wire rope 410 is narrow and the front portion thereof is wider, and a connection ring 421 is disposed at the rear portion thereof for connecting the wire rope 410 as shown in FIG. 12B, and a hinge plate 422 is disposed at the end portion thereof for a up/down movement of the buoy 500 as shown in FIGS. 12C and 12D.

In addition, the connection rod 420, as shown in FIG. 8A and FIG. 12A, includes a folding portion 423 at the intermediate portion thereof for buffering a force generated by the up/down movement of waves and applied to the connection rod 420, so that the connection rod 420 can be folded thereat.

When connecting the wire rope 410 to the post member 326 and the connection ring 421 of the post member 326, a predetermined connection member such as a shackle, a wire clamp or the like is used.

The bottom portion of the buoy 500, as shown in FIGS. 8A, 8B, and 8C and FIGS. 13A and 13B, is shaped as the bottom portion of a boat, and is sealed to have a predetermined float force, and the intermediate portion thereof is hinged to the end of the connection rod 420 for a up/down movement of the buoy 500.

Here, a long side of the buoy 500 is connected to the connection rod 420 so that the lower surface of the buoy 500 can come into substantial contact with sea water with the lengthy-side of the buoy 500 is at an angle of 90o to the forwarding direction of waves.

Figure 13B:
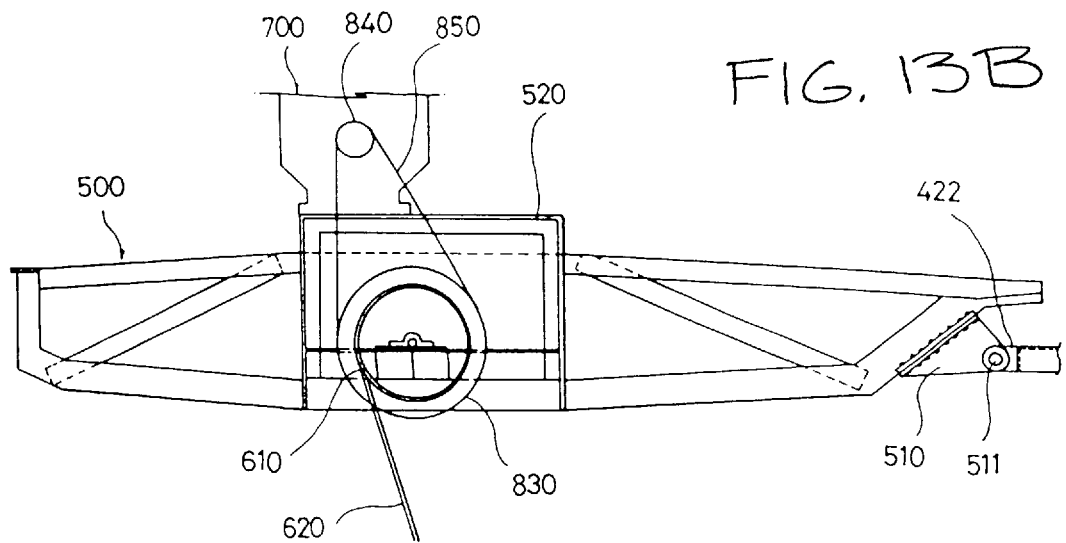

The buoy 500, as shown in FIG. 13B, includes a sharp angle or a streamline shape at the front portion so as to minimize the horizontal resistance with respect to sea water.

In addition, the weight center of the buoy 500 is eccentrically positioned at the end portion (that is, at the rear side of forwarding wave). In more detail, the weight center thereof is positioned at one-third of the end portion of the short axis.

As shown in FIGS. 8A through 8C and FIGS. 12C and 12D, a pair of hinge plates 510 is fixed to the front center portion of the buoy 500, and the hinge pin 511 is connected to the hinge plate 422 fixed at the end of the connection rod 420.

As shown in FIGS. 13A and 13B, a drum casing unit 520 in which a rotation drum 610 of the rotation force generation unit 600 is provided is disposed at the center portion of the buoy 500, so that the interior of the same is partitioned into a plurality of chambers, and thus it is possible to secure the safety operation thereof when it is damaged.

The drum casing unit 520 is preferably disposed at a predetermined portion eccentric from the center thereof, so that the weight center of the buoy 500 becomes eccentric from the center to the end portion. Thereby, the front side of the buoy 500 is not lifted and is submerged within sea, and the front portion of the buoy 500 is exposed beyond the sea surface, so that it is possible to effectively use wave force.

In particular, the entire weight center of the buoy 500, the rotation force generation unit 600, and the compressed liquid generation unit 700 is positioned at one-third of the short axis of the same, and the lengthwise front side of the buoy 500 is inclined toward the frontside thereof in a state that it is not submerged within sea, so that the vertical force of horizontal direction wave pressure applied to the buoy 500 acts as a force to lift the buoy 500, thereby enabling the buoy 500 to lift/lower more easily.

Manholes 530 are provided on the upper surface of the buoy 500 for maintenance of the various facilities provided therein.

The rotation force generation unit 600, as shown in FIGS. 8A and FIGS. 12A through 12C, includes the rotation drum 610 rotatably disposed at the drum casing unit 520 of the buoy 500, a driving wire rope 620 of which its one end is connected to the end of the arm member 323 in a state that the winding leading portion is fixed to the rotation drum 610, and a rotation elastic member 630 for generating a predetermined rotation force in the direction the driving wire rope 620 is wound on the rotation drum 610.

Figure 13C:
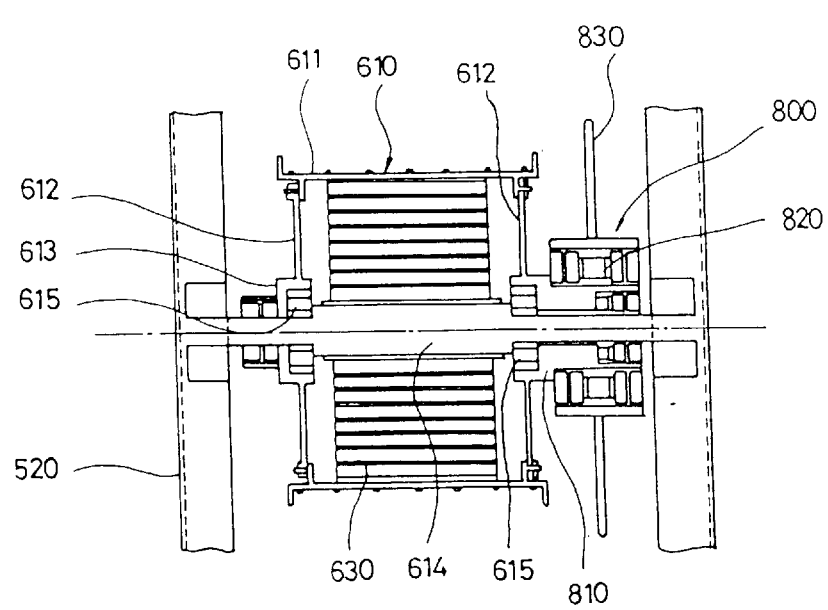
Figure 13D:
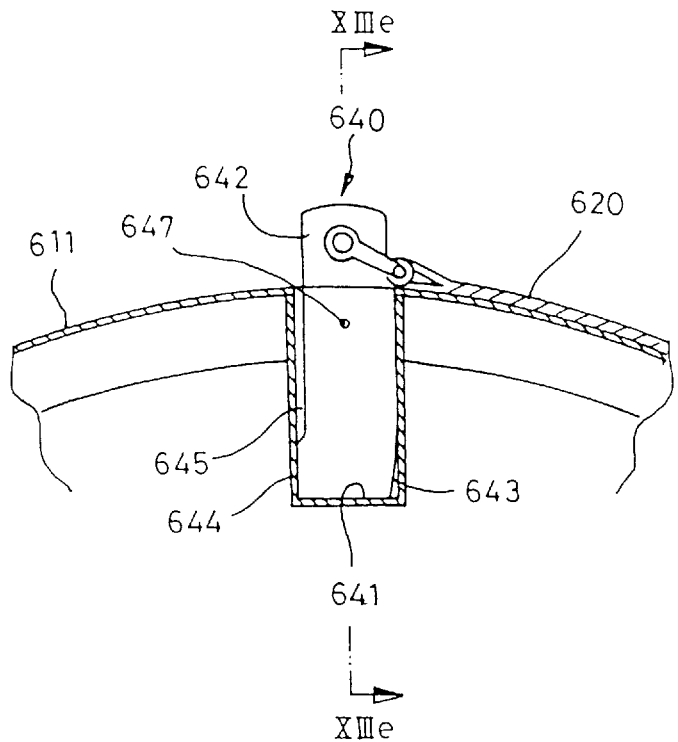

The rotation drum 610, as shown in FIGS. 13C and 13D, is rotatably supported within the drum casing unit 520, and includes a cylindrical section 611 onto which the driving wire rope 620 is wound, and a circular plate 612 foxed to both sides of the cylindrical section 611. A bearing box 613 is formed at the center portion of the circular plate 612, so that a bearing 615 is inserted thereinto for supporting a fixing shaft 614 of the circular plate 612.

The outer end of the rotation drum 610 is fixed to the fixing shaft 614 as the rotation elastic member 630, and a spiral spring is connected to the cylindrical section 611 of the rotation drum 610 at the outer end of the same. However, the member thereof is not limited thereto. Any element having a construction for elastically recovering in the direction that the driving wire rope 620 is wound can be used therefor.

Meanwhile, the winding length of the driving wire rope 620 is determined in consideration of the height of wave in the construction site. When there is relatively high waves therein, the driving wire rope 620 is completely released from the rotation drum 610. When the buoy 500 directly receives a lifting pressure from waves, the driving wire rope 620 may be cut. When the force is applied to the buoy 500, the lifting/lowering support unit 400, the rotation unit 300, or the like, they may be broken. In order to prevent the above-mentioned problems, a safety connection unit 640 is used in the system.

The safety connection unit 640, as shown in FIGS. 13C and 13D, includes a groove 641 formed in the tangential direction at a portion of the rotation drum 610, at which the winding leading portion of the driving wire rope 620 is fixed, and a safety pin 642 of which its outer portion in inserted into the groove 641 and is outwardly protruded. The winding leading portion of the driving wire rope 620 is connected to the protruded portion of the safety pin 642, so that when the driving wire rope 620 is completely released from the rotation drum 610, the winding leading portion of the same is escaped from the rotation drum 610.

The safety pin 642, as shown in FIG. 13D, includes a deeply curved cut-away portion 643 formed at the inner end portion of the same in the winding direction thereof, and a cut-away portion 645 formed therein except for the portion of the attaching section 644 at the inner side thereof in the releasing direction, so that the safety pin 642 can be easily escaped therefrom when the pulling force applied to the driving wire rope 620 when the driving wire rope 620 is completely released is applied thereto in the tangential direction by attaching the opposed side of the releasing direction of the safety pin 642 to the inner surface of the groove 641 in cooperation with the pulling force of the driving wire rope 620, and by attaching the outer end of the same in the winding direction to the inner surface of the groove 641.

Figure 13E:
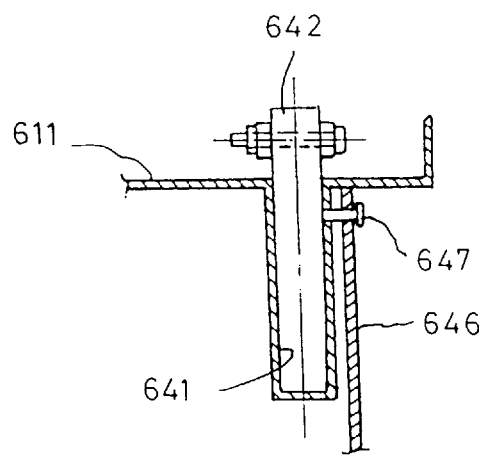

In addition, as shown in FIG. 13E, a bracket 646 is closely disposed to one side of the groove 641, and a tightening screw 647 for pressing the safety pin 642 in the groove 641 is adapted to prevent the safety pin 642 from escaping from the groove 641.

The driving wire rope 620 wound onto the rotation drum 610 preferably includes a rope releasing position which is preferably eccentric from the center portion of the same to the rear portion (to the rear portion of the forwarding waves), and most preferably, the rope releasing position is located at one-third position at the short axis of the rear portion.

The compressed liquid generation unit 700, as shown in FIGS. 8A and 8B and FIGS. 13A and 13B, is disposed at the upper portion of the drum casing unit 520, and a discharging port (not shown) communicates with a compressed liquid transferring hose 910, In this embodiment, a liquid pump or a hydraulic pump can be preferably used as the compressed liquid generation unit 700. More preferably, a piston pump is used.

Here, when using the liquid pump as the compressed liquid generation unit 700, a suction port (not shown) is always submerged within sea by disposing it at the bottom portion of the buoy 500, and when using the hydraulic pump as the compressed liquid generation unit 700, the suction port is disposed at the upper portion of the buoy 500 so as to prevent sea water from introducing thereinto.

The one-directional driving unit 800 is basically directed to transferring a rotation force of the rotation drum 610, which is generated when the driving wire rope 620 wound on the rotation drum 610 when the buoy 500 is lifted in response to waves, to the compressed liquid generation unit 700. As shown in FIGS. 13A through 13C, the one-directional driving unit 800 includes a driving shaft 810 extended in the shaft-wise direction from the circular plate 612 of the rotation drum 610, a driving sprocket 830 connected to a one-directional clutch 820, a driven sprocket 840 fixed to the shaft of the compressed liquid generation unit 700, and a chain 850 wound onto the driven sprocket 840 and the driving sprockets 830 and 840.

The one-directional clutch 820 is basically directed to transferring a rotation force to the driving sprocket 830 when the rotation drum 610 rotates in the direction the driving wire rope 620 is released, and on the contrary it does not transfer a rotation force to the driving sprocket 830 when the rotation drum 610 rotates in the direction that the driving wire rope 620 is wound. In this embodiment, for the above-mentioned object, a one-directional clutch bearing is used as the one-directional clutch 820; however, the use thereof is not limited thereto. Any element capable of transferring one-directional force to the compressed liquid generation unit 700 can be used.

As shown in FIGS. 8A and 8B and FIGS. 14 through 17D, the compressed liquid transferring unit 900 includes the compressed liquid transferring hose 910 connected between the discharging port of the compressed liquid generation unit 700 and the upper portion of the support member 310, the hollow tube body 312 which is used for the compressed liquid transferring and is formed within the support member 310, a part of the frame 100 which is used for the compressed liquid transferring and connected to the hollow tube body 312, and a main transferring tube 950 vertically disposed at the power generation sector S1 and connected between the compressed liquid transferring frame 100 and the turbine T.

The compressed liquid transferring hose 910 is connected to the upper portion of the support member 310 of the rotation unit 300. Here, a cap member 911 is disposed on the top of the support member 310 for a sealing thereof. The compressed liquid transferring hose 910 is connected to the cap member 911 using a packing (not shown) so that the compressed liquid transferring hose 910 is not twisted or entangled when the rotation unit 300 rotates in a predetermined direction.

A mechanical sealant (not shown) is usually used between the upper portion of the support member 310 and the cap member 911 so as to prevent any leakage from the rotation portion.

The compressed liquid transferring hose 910 is firmly connected to the connection rod 420 of the lifting/lowering support unit 400, the wire rope 410, the support member 310 of the rotation unit 300, and the like, so that it becomes rotatable.

The compressed liquid transferring frame 100 has a predetermined diameter of which its size is reduced toward the main transferring tube 950 of the center portion from the outer side of the entire system thus effectively transferring the compressed liquid.

Namely, as shown in FIG. 14, the compressed liquid is gathered at the frame 100 positioned at the center portion where the lattice frame structure is divided one-fourth from the other frames 100, and the frame 100 of the center portion of the same is directly connected with the main transferring tube 950, so that the compressed liquid is transferred through the main transferring tube 950. In addition, at the end portion of the same, the frame 100 which is used as the compressed liquid transferring, namely, the frame 100 except for the frame 100 as shown in FIG. 14 are constructed for obtaining a necessary floating force.

In addition, reverse flowing prevention valves CV1, CV2, and CV3 are provided in the system.

The main transferring tube 950 is connected to the upper portion of the auxiliary frame 160 disposed at the electric power generating sector S1 of the frame 100.

A surge tank 960 is disposed between the main transferring tube 950 and the compressed liquid transferring frame 100 so as to more stably support the weight of the system disposed at the electric power generation sector S1.

The surge tank 960, as shown in FIGS. 15A and 15B, is disposed at the lower surface of the frame 100 and includes a cylindrical section 961 surrounding the lower portion of the main transferring tube 950, upper and lower spherical plates 962 and 963 forming the upper and lower surfaces of the cylindrical section 961, and a manhole 964 formed at the center portion of the lower spherical plate 963.

Figure 16A:
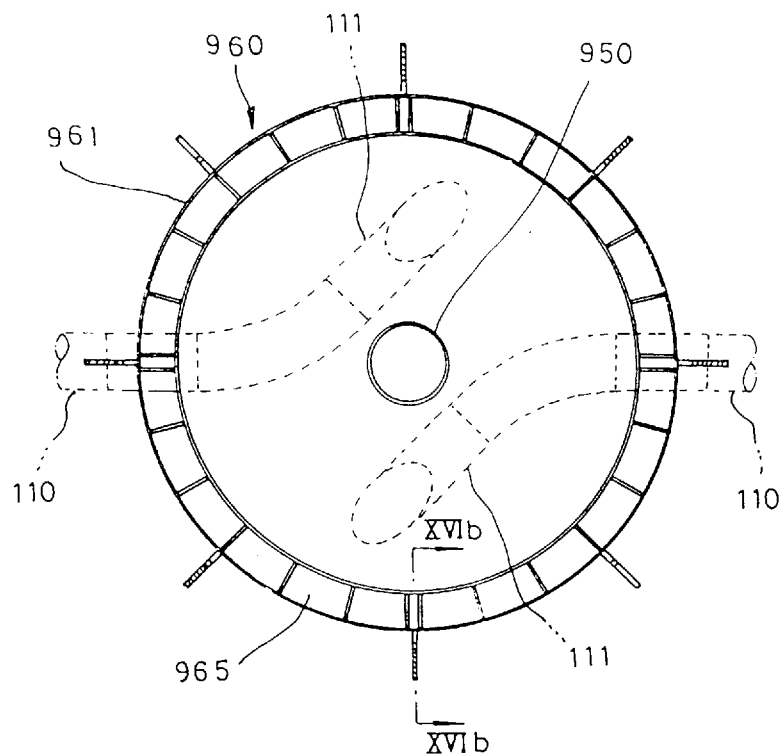
Figure 16B:
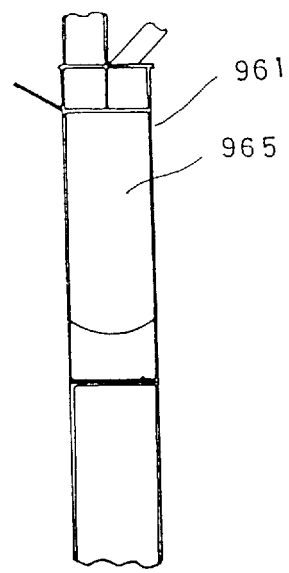

The cylindrical section 961 of the surge tank 960, as shown in FIG. 16A and 16B, is made of a double tube, and the interior of the same is filled with the compressed air, and an air pocket 965 is formed therein.

Here, in case that when a liquid pump is used as the compressed liquid generation unit 700, the compressed liquid transferred from the compressed liquid transferring frame 100, that is, the compressed water, has a predetermined level in the second gathering/transferring tube 940, and an air chamber 966 is formed at the upper portion of the internal compressed water W in which a predetermined pressure is provided.

In addition, when the compressed water W in the surge tank 960 is flown to elsewhere through the lower portion of the main transferring tube 950, the surge tank 960 has a predetermined level of the compressed water W therein so as to prevent air from introducing thereinto.

That is, when the height from the lower portion of the main transferring tube 950 to the water surface of the compressed water W in the surge tank 960 is low, and when the compressed water W is introduced thereinto through the lower portion of the main transferring tube 950, air may be introduced thereinto together with the compressed water W. As mentioned above, air in the air chamber 966 is introduced thereinto, water hammer occurs in the system, causing malfunction of the turbine T. Therefore, when designing the system, the above-mentioned condition should be considered.

In addition, the compressed water W in the surge tank 960 receives a counterclockwise directional rotation force in the northern area of the Earth. On the contrary, in the southern area of the Earth, the compressed water W in the surge tank 960 receives a clockwise directional rotation force therein, causing spiral current of water therein. Thereby, the water level at a periphery of the current is increased, and the water level of the center portion thereof is decreased. Therefore, the height from the water level at the center portion to the lower portion of the main transferring tube 950 becomes lowered, so that air is introduced thereinto from the air chamber 966.

Therefore, as shown in FIG. 16A, the curved portion 942 is formed at the end of the compressed liquid transferring frame 100, so that the compressed water introduced to the surge tank 960 from a curved portion 101 is introduced in the direction that it can offset the spiral current of water, so that the compressed water introduced into the surge tank 960 from the compressed liquid transferring frame 100 is introduced so as to offset the spiral current of water.

That is, in the northern region of the Earth, since the current is spirally formed in the counterclockwise direction, the compressed water introduced thereinto from the serge tank 960 should be introduced thereinto in the clockwise direction. In addition, in the southern region of the Earth, since the spiral current is formed in the clockwise direction, the compressed water introduced from the serge tank 960 is introduced in the counterclockwise direction.

As shown in FIG. 15B, the upper portion of the main transferring tube 950 is closed, and a branched tube 952 connected to the turbine T is connected to both sides of the same. In addition, as shown in FIGS. 17A through 17D, a governor spill valve 970 is disposed at the branched point so as to keep the pressure of compressed liquid supplied to the turbine T constant.

In addition, as shown in FIGS. 17A through 17D, the governor spill valve 970 includes a spill hole 971 formed at the branched portion of the main transferring tube 950, a spill way 972 attached to the outer side of the governor spill valve 970, an opening/closing plate 973 rotatably disposed at the outer wall of the main transferring tube 950 for opening/closing the spill way 972, and an attaching unit 980 for closely attaching the opening/closing plate 973 to the outer portion of the spill way 972.

Figure 17A:
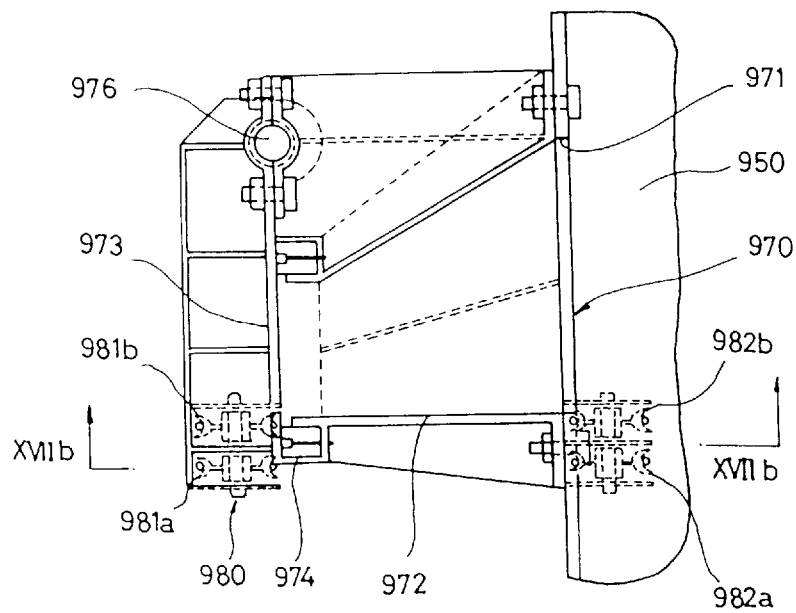
Figure 17B:
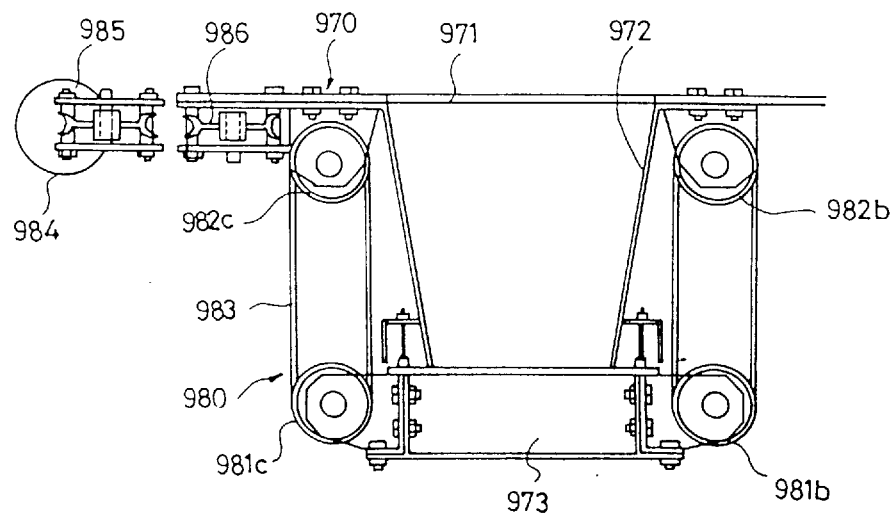

As shown in FIG. 17B, the spill way 972 is formed in a form of a reducer, which the cross-sectional surface area of the same becomes reduced, and a packing 974 is formed at the outer portion thereof.

As shown in FIG. 17A, the opening/closing plate 973 is opened/closed by supporting the upper portion of the same to a bracket 975 fixed to the wall of the main transferring tube 950 using a support shaft 976.

Figure 17C:
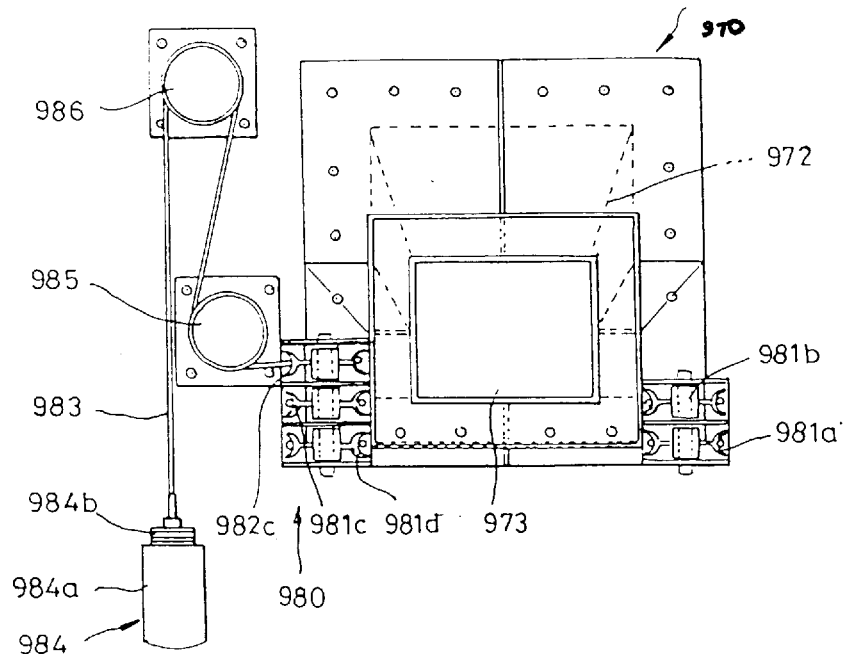

As shown in FIGS. 17A through 17C, the attaching unit 980 can be made in any form which can sealingly attaching the opening/closing plate 973 to the outer portion of the spill way 972. In this embodiment, preferably, the attaching unit 980 includes a driving roller 981 disposed at both lower ends of the opening/closing plate 973, a fixed roller 982 disposed at both side walls of the main transferring tube 950 with respect to the driving roller 981, an attaching wire rope 983, of which its end is connected to the driving roller 981, and a weight 984 connected to the end of the rope 983 for pulling the rope 983.

Here, the attaching force with respect to the outer end of the spill way 972 is directed to a sum force between the weight of the opening/closing plate 973, a force applying in the direction that the opening/closing plate 973 is closed in cooperation with the water pressure externally applied thereto, and a force of pushing the driving roller 981 toward the fixed roller 982. The above-mentioned sum force is determined in consideration of the safety. In addition, it is possible to obtain a desired attaching force by using a multiple roller construction with light rollers.

Figure 17D:
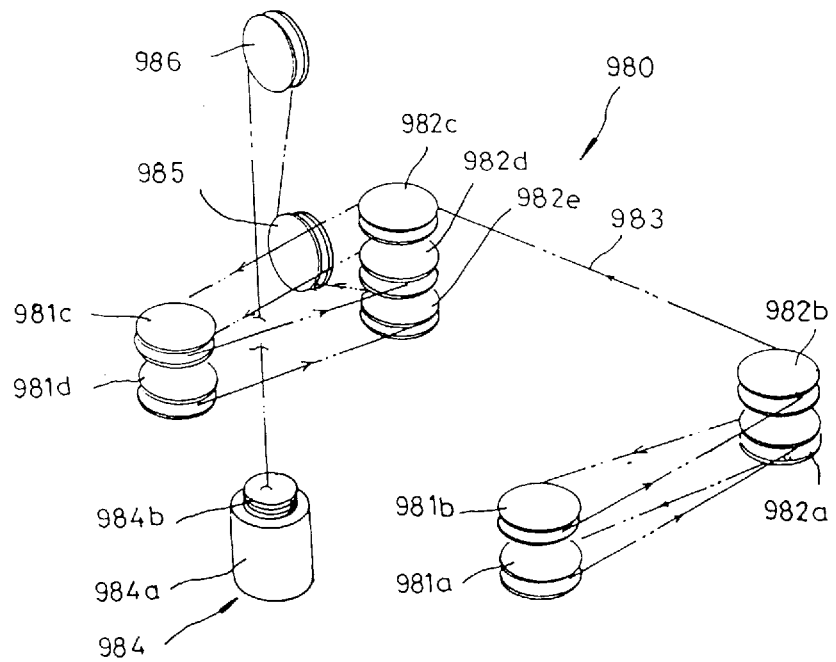

That is, as shown in FIG. 17D, the leading portion of the wire rope 983 is affixed to the first fixed roller 982a disposed at a predetermined portion of the main transferring tube 950 and is wound in an order that the first driving roller 981a disposed at the lower portion of the opening/closing plate 973, the second fixed roller 982b disposed at the same axis as the first fixed roller 982a, the second driving roller 981b disposed at the same axis as the first driving roller 981a, the third fixed roller 982c disposed at the wall of the main transferring tube 950, the third driving roller 981c disposed at the other side of the opening/closing plate 973, the fourth fixed roller 982d disposed at the same axis as the third fixed roller 982c, the fourth driving roller 981d disposed at the same axis as the third driving roller 981c, and the fifth fixed roller 982e disposed at the same axis as the fourth fixed roller 982d, and is then wound in the vertical direction through the direction conversion rollers 985 and 986, and is fixed to the weight 984.

The weight 984 includes a weight body 984a having a predetermined weight, and an assistant weight 984b detachably mounted on the upper portion of the weight body 984a for adjusting the total weight of the weight 984 in accordance with an effective pressure of the compressed liquid.

In this embodiment, a common type of an electric power generator is used as the turbine T and the electric power generator D.

Figure 18B:
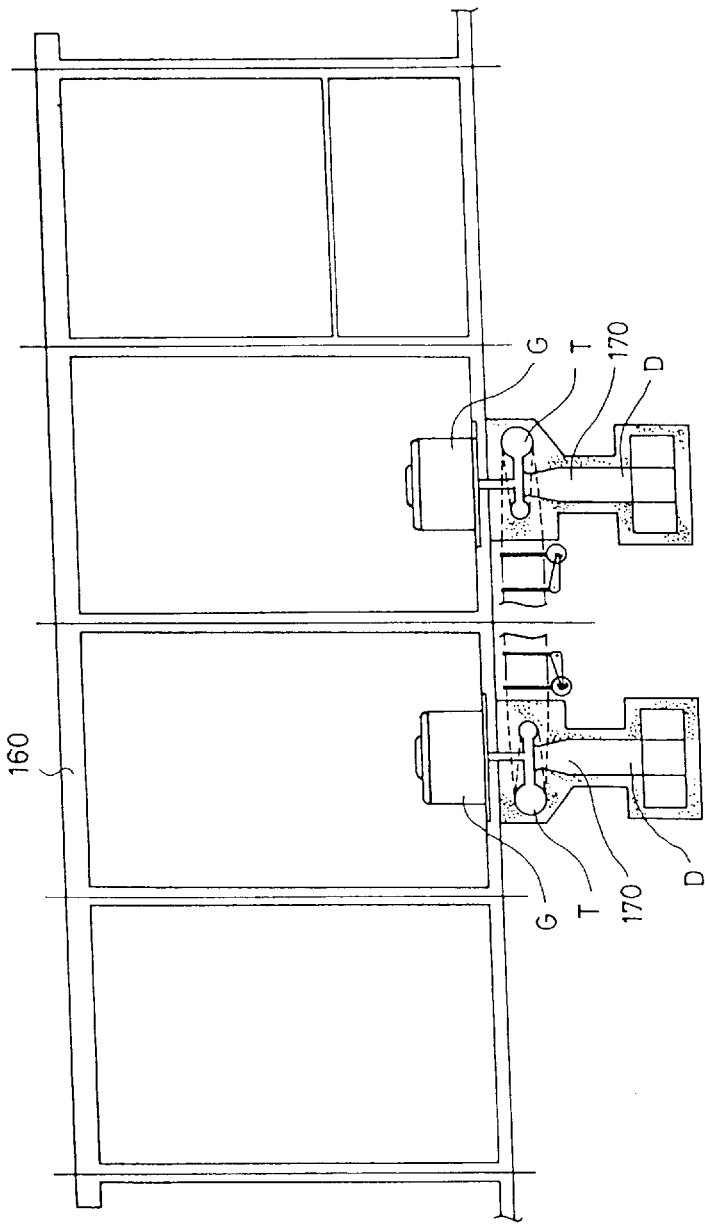

FIGS. 18A, 18B, and 18C show the construction of various facilities mounted on the electric power generating sector S1, which includes a turbine T connected to the branched tube 952 of the main transferring tube 950 by a spiral tube 953, and an electric power generator G driven by the turbine T, a controller 991, a transformer (not shown), an electric power transferring facility 992, an office (not shown), and a lodging house 993.

The turbine T and the electric power generator G are engaged to the auxiliary frame 160 having a predetermined height.

Here, the auxiliary frame 160 is protrudedly disposed beyond the sea surface, and a discharging port 170 of the turbine T is positioned at a predetermined portion higher than the sea surface.

Meanwhile, in case of using a liquid pump as the compressed liquid generation unit 700, a drain D is formed so as to drain compressed water discharged from the discharging port 170 of the turbine T, and when using a hydraulic pump as the compressed liquid generation unit 700, compressed air driven the turbine T is discharged into the air. Therefore, in this case, the drain may be omitted.

Here, as the turbine T, a hydraulic turbine used in a conventional hydraulic generator is used when a liquid pump is used as the compressed liquid generation unit 700, and when a hydraulic pump is used, a turbine which is driven by compressed air is used.

Here, since the spiral tube 953 is applied with a predetermined force in the counterclockwise direction, the spiral shape is formed in the counterclockwise direction in the northern region of the Earth, and since the spiral tube 953 receives a predetermined force applied thereto in the clockwise direction, the spiral shape is formed in the clockwise direction in the southern region of the Earth.

In this embodiment, a liquid pump is used as the compressed liquid generation unit 700, and a hydraulic turbine is used as the turbine T. Therefore, a drain path of the compressed water is formed in the system; however, in case of using an air pump or an air turbine, the compressed air driven the air turbine is discharged to the air.

The operation of the method and apparatus for generating an electric power using wave force according to the present invention will now be explained with reference to the accompanying drawings.

To begin with, the assembling order of the system will now be explained.

When setting up heavy and big facilities on/within sea, the related facilities are assembled at seaside or a nearby beach, and it is moved to the construction site. In this case, it takes too much time and cost for the movement of the system. In addition, when the whether is rapidly changed, the construction process should be stopped. In this embodiment, the entire construction of the system is divided into five section, which is indicated by the two-dash-dot line of FIG. 3, at a nearby seaside or beach, and thereafter five section are assembled at the construction site. At the construction site, the frame 100 is submerged at a predetermined depth within sea in cooperation with the anchor block 210, the anchor rope 220, and the branched ropes 221. Here, the installation position of the frame 100 is determined, based on the buoyant force of the frame 100 into which pressure air is inserted and the length and tension of the anchor rope 220 and the branched rope 221. That is, the frame can be stably moored there when wave is applied thereto in any directions.

Here, when there is a predetermined difference of the tension between the anchor rope 220 and the branched rope 221, external force is applied to the anchor ropes 220 and 221 which have a relatively big tension as compared to the other elements. When the anchor ropes 220 and 221 are broken by the force applied thereto, the next ropes are applied with the force, so that the tension applied to the anchor rope 220 and the branched rope 221 become constant.

The tension of the anchor rope 220 and the branched rope 221 is adjusted by the tension adjusting member 250. That is, as shown in FIGS. 7A through 7D, the tension adjustment is performed when the tightening wire rope 255 wound between the rollers 363 and 364 disposed at the connection rings 251 and 252 each fixed to the upper portion of the branched rope 221 and the lower surface of the frame is tightened. At this time, since there is provided a tension gage (not shown) at the end portion of the tightening wire rope 255, the tension of the anchor rope 220 and the branched rope 221 is evenly adjusted.

Meanwhile, in accordance with the condition of sea or the sea floor at the construction site, the anchors are partially or entirely planted into the sea bed, and the anchor ropes 220 are connected thereto so as to moor the frame 100.

Since the surge tank 960 has a relatively large buoyant force in cooperation with the air pocket 965 and the air chamber 966, there is a difficulty to substantially submerge the surge tank 960 within sea. So, as shown in FIG. 15B, the entire construction is divided into four (4) sections, and the thusly divided sections are moved to the construction site and assembled there. Thereafter, compressed air is filled into the air pocket 965 and the air chamber 966.

In addition, the surge tank 960 can substantially resist up to the entire weight of the system, which is applied to the electric power generating sector S1, in cooperation with the buoyant force of the air pocket 965 disposed at the wall and the air chamber 966 formed within the surge tank 960.

Next, the electric power generation method will now be explained.

To begin with, the lifting/lowering movement of the buoy 500 will now be explained with reference to FIG. 8B.

The buoy 500 is always floated on sea. When there is no a desired wave in sea, the buoy 500 is floated on the mean sea level. When there is a desired wave, the buoy is lifted/lowered between waves. That is, it moves in response to waves applied thereto.

At this time, the upper portion of the rotation unit 300 is protruded beyond the sea surface, and since the front edge portion of the buoy 500 is tiltable about the end portion of the connection rod 420 in cooperation with the hinge plates 422 and 510 and the hinge pin 511 when a strong wave is applied thereto. That is, the front portion thereof is always submerged at a predetermined depth within sea, so the buoy 500 is lifted/lowered in response to the waves applied thereto by the height of the waves.

In addition, the buoy 500 has its weight center at a nearby one end portion of the buoy. That is, the entire weight center thereof is eccentric toward one end of the same due to the drum casing unit 520, the rotation drum 610, the one-directional driving unit 800, and the compressed liquid generation unit 700. In addition, since the releasing position of the driving wire rope 620 is eccentric from the center of the same, the rear side of the buoy 500 (that is, the forwarding side of waves) is always lifted, and the front side of the buoy 500 (that is, the rear side of forwarding waves) is always submerged within sea, so that the buoy is floated on sea in a form that the front side thereof to which wave is applied is lifted and the opposed side thereof is always submerged within sea. Therefore, a desired stable up/down movement of the buoy 500 can be achieved.

Figure 9A:
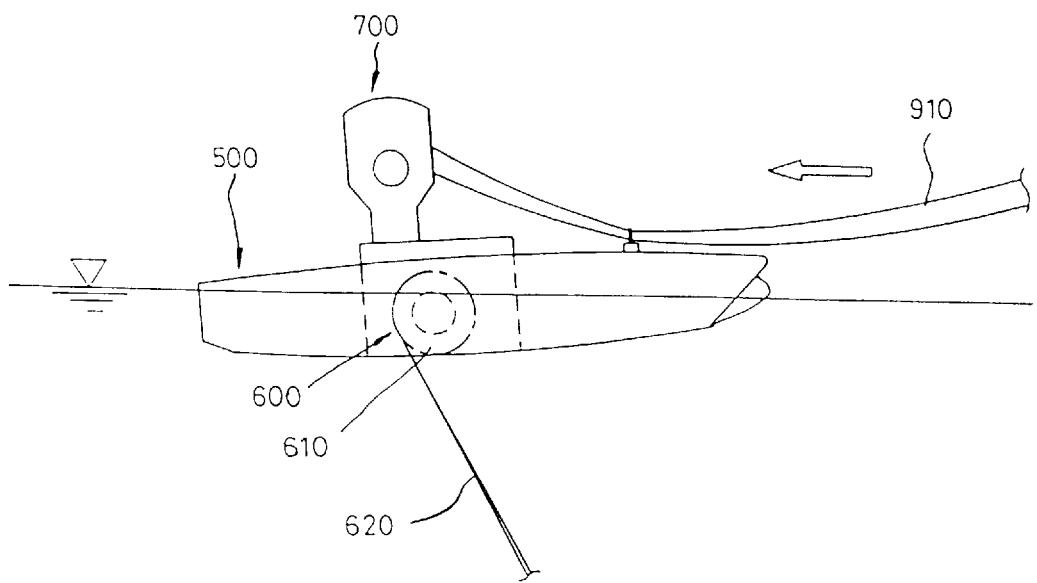
Figure 9B:
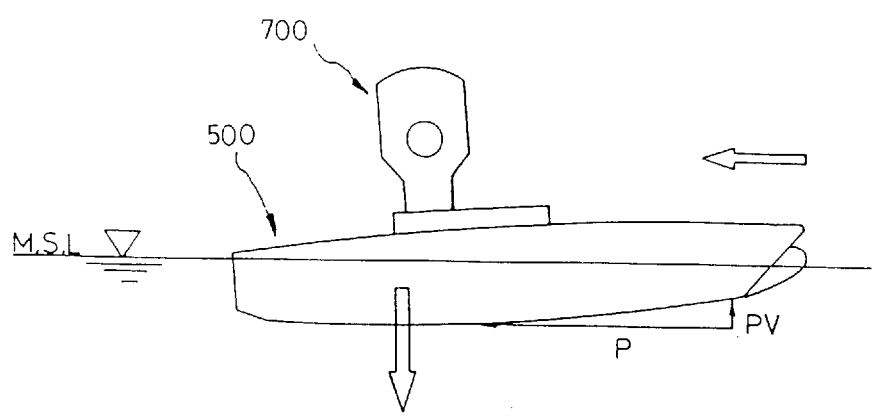

That is, when the weight center of the buoy 500 is at the center of the same, and when the releasing position of the driving wire rope 620 is positioned at the center of the same, the force downwardly applying with respect to the buoy 500 is evenly applied in the direction of the short axis of the same, so the front side and rear side of the buoy 500 are at the same plane. In this case, the buoy 500 receives a horizontal wave force, which is irrespective of the up/down movement of the buoy 500, so that a desired up/down movement of the buoy 500 can not be achieved. In addition, when a strong force is applied to the buoy 500 and the rotation and support units 300 and 400 supporting the buoy 500, the buoy 500 and the rotation and support units 300 and 400 may be broken. So, in this embodiment, as shown in FIG. 9A, the weight center of the buoy 500 and the releasing position of the driving wire rope 620 are eccentric from the center of the buoy 500. That is, it is positioned at one-third from the end side of the same. The force downwardly applied with respect to the buoy 500 is strong at the front side thereof, and it is weak at the rear side of the same. The front side of the buoy 500 (that is, the side to which wave is applied) is always lifted, and the opposed side of the same is submerged within sea, so that a desired up/down movement of the buoy can be achieved. In addition, as shown in FIG. 9B, since the horizontal wave force P applied to the sharp front side of the buoy 500 is applied in detail at the lower side of the buoy 500, the buoy 500 can be more easily moved upwardly/downwardly in cooperation with a vertically applying force of waves. That is, since the present invention is directed to using a wave force which is generated when the buoy 500 is lifted, it is possible to more easily obtain a desired force.

Meanwhile, when the wave is applied to the buoy 500 and the lifting/lowering support unit 400, the buoy 500, as shown in FIGS. 8B and 8C, is moved in the direction of the forwarding wave. The force applied to the buoy 500 is also applied to the lifting/lowering support unit 400 and the rotation unit 300, and the force rotates the lifting/lowering support unit 400. That is, a horizontally extending line connecting the rotation center of the rotation unit 300 and the center of the buoy 500 coincide with the direction of the forwarding wave.

Therefore, at the initial stage that the direction of the forwarding wave is changed, when the wire rope of the lifting/lowering support unit 400 becomes slightly bent, a rotation frame 320 integral with the support member 310 to which the wire rope 410 is fixed is rotated, and the extending line of the lifting/lowering support unit 400 coincides with the direction of the forwarding waves, so that the system has its original shape, and thus a desired up/down movement of the buoy 500 is achieved as shown in FIGS. 8B and 8C.

That is, the front side, which is always lifted in response to the waves applied thereto, of the buoy 500 is always applied with the forwarding waves, so that the front lower surface of the buoy 500 is applied with the forwarding waves, and it is lifted, and thus a more effective up/down movement of the buoy 500 can be achieved.

In addition, since the buoy 500 is rotatable connected to the end of the connection rod 420 in cooperation with the hinge plates 422 and 510 and the hinge pin 511, the up/down movement at a position in which the rotation force generation unit 600 is disposed becomes great, so that the operation of the rotation force generation unit 600 becomes more activated.

The rotation force generation method in accordance with an up/down movement of the buoy 500 will now be explained.

While the buoy 500 is moved from the valley of a wave to the top of the wave, since the driving wire rope 620 connected to the end of the arm member 323 is pulled, the driving wire rope 620 wound onto the rotation drum 610 is released, and the rotation drum 610 is rotated in response to the length of the released driving wire rope 620, overcoming an elastic force of the rotation elastic member 630.

When the rotation drum 610 is rotated, the compressed liquid generation unit 700 connected to one side of the circular plate 612 of the rotation drum 610 in cooperation with the one-directional driving unit 800 is driven.

That is, when the rotation drum 610 is rotated in the direction that the driving wire rope 62 is loosened, the driving shaft 810 fixed to one side of the circular plate 612, and the driving sprocket 830 connected to the driving shaft 810 via the one-directional clutch 820 are rotated, and this rotation force is transferred to the compressed liquid generation unit 700 through the chain 850 and the driven sprocket 840 in order for the compressed liquid generation unit 700 to be driven, thus generating the pressured liquid.

Here, in case that the compressed liquid generation unit 700 is a liquid pump, since the inlet portion (not shown) is submerged within the sea, the sea water is sucked into the compressed liquid transferring hose 910 through the discharging port (not shown) and then is compressed. In case that the compressed liquid generation unit 700 is a hydraulic pump, air is sucked thereinto through the suction port which is exposed to the air, compressed therein, and is then discharged to the compressed liquid transferring hose 910 through the discharging port.

In addition, the driving wire rope 620 wound onto the rotation drum 610 has a predetermined length which is decided based on the height of waves at the construction site of the apparatus. So, when waves having a predetermined height is applied to the apparatus, the driving wire rope 620 is substantially loosened from the rotation drum 610, and the driving wire rope 620 is pulled in the normal line direction with respect to the rotation drum 610, and the driving wire rope 620 is escaped from the rotation drum 610 in cooperation with the safety connection unit 640, and the wave force lifting the buoy 500 is not applied to the driving wire rope 620. Namely, the wave force is applied to only the lifting/lowering support unit 400, so that the lifting/lowering support unit 400 is lifted/lowered in accordance with the lifting/lowering movement of the buoy 500, absorbing the wave force, so that breakage of the driving wire rope 620, the buoy 500, and a plurality of support units are prevented.

Namely, since the winding start portion of the driving wire rope 620 is connected to the protruded end of the safety pin 642 inserted into the groove 641 formed at the rotation drum 610 in the normal line direction of the same, in a state that the driving wire rope 620 is substantially loosened, the safety pin 642 is escaped by the force applied to the driving wire rope 620 in the normal line direction of the rotation drum 610, and thus the driving wire rope 620 is escaped from the rotation drum 610.

Since the safety pin 642 is tightened by the tightening screw 647 engaged to the bracket 646 disposed at one side of the groove 641, at a usual time, the safety pin 642 is not escaped from the groove 641, however, when a predetermined force is applied to the driving wire rope 620 in the normal line direction of the rotation drum 610, the safety pin 642 is escaped therefrom, and thus the above-mentioned safety operation is achieved.

Meanwhile, when the buoy 500 is lowered at the valley of the waves which is indicated by the doted line in FIG. B, the driving wire rope 620 maintains a loosened state, and the rotation drum 610 is rotated in the reverse direction by the rotation elastic member 630 in order for the driving wire rope 620 is wound, and only when the one-directional clutch 820 of the one-directional driving unit 800 directed to transferring the rotation force of the rotation drum 610 to the compressed liquid generation unit 700 is rotated in the direction that the driving wire rope 620 is loosened, the rotation force is applied to the driving sprocket 830. On the contrary, when the driving wire rope 620 is rotated in the direction that the driving wire rope 620 is wound, the rotation force is not applied to the driving sprocket 830, so that only the rotation drum 610 is rotated. In addition, since the driving sprocket 830 is not rotated, the compressed liquid generation unit 700 connected to the driving sprocket 830 through the chain 850 and the driven sprocket 840 is not driven.

Therefore, the compressed liquid generation unit 700 is continuously driven in one direction that the pumping operation is performed.

The compressed liquid transferring process in accordance with the driving of the compressed liquid generation unit 700 will now be explained.

The compressed liquid discharged from each compressed liquid generation unit 700 is applied to the turbine T through the compressed liquid transferring unit 900 in order for the turbine T to be driven During this compressed liquid transferring process, the compressed liquid is gathered at the compressed liquid transferring frame 100 through the compressed liquid transferring hose 910 connected to the outlet port of the compressed liquid generation unit 700 and the hollow tube unit 312 of the support member 310 connected to the compressed liquid transferring hose 910, and is then transferred to the main transferring tube 950.

At this time, since reverse flowing prevention valves CV1, CV2, and CV3 are disposed at the end portion of the compressed liquid transferring frame 100, there is not reverse flowing of the compressed liquid during this compressed liquid transferring process. Namely, the compressed liquid always flows to the main transferring tube 950, preventing any loss of the compressed liquid.

The compressed liquid passed through the compressed liquid transferring frame 100 is transferred to the main transferring tube 950 through the serge tank 960, and the is transferred from the main transferring tube 950 to the turbine T in order for the turbine to be driven, so that the electric generator G is driven in accordance with the driving of the turbine T, thus generating electric power.

The compressed liquid arrived at the end portion of the compressed liquid transferring frame 100 is introduced into the serge tank 960, and the serge tank releases the pulsatory motion of the compressed liquid, reducing the variations of the pressure of the compressed liquid and the amount of the liquid.

When the pressure of the compressed liquid passing through the main transferring tube 950 exceeds a predetermined set level, the governor spill value 970 disposed at the upper portion of the main transferring tube 950, and the pressure level is lowered, so that a compressed liquid having a predetermined pressure level is supplied to the turbine T.

Namely, as shown in FIGS. 15B, and 17B through 17D, the spill hole 971 is formed at the branched portion of the main transferring tube 950, and the spill way 972 is formed at the outer portion of the spill hole 971, and the opening port of the spill way 972 is closed by the opening/closing plate 973, and the opening/closing plate 973 closes the opening port of the spill way 972 in cooperation with the attaching unit 980. When the pressure of the main transferring tube 950 exceeds a predetermined level, the inner pressure of the same overcomes the force which causes the opening/closing plate 973 to be attached by the attaching unit 980, so that the opening/closing plate 973 is opened, and thus the compressed liquid is discharged into the sea. When the pressure in the main transferring tube 950 is made lower than a predetermined level, the opening/closing plate 973 closes the spill way 972 in cooperation with the attaching force of the attaching unit 980, so that the compressed liquid having a constant pressure is always applied to the turbine T.

The operation of the attaching unit 980 will now be explained in more detail. The wire rope 983 of which its start portion is fixed to the fixed roller 982 disposed at the main transferring tube 950 is wound between the fixed roller 982 and the driving roller 981 disposed at both ends of the opening/closing plate 973, and the weight 984 is fixed to the end portion thereof. The weight being applied in the vertical direction is converted into the horizontal weight through direction conversion rollers 985 and 986, and is then applied in the direction that the wire rope 983 wound between the driving roller 981 and the fixed roller 982 is tightened. Thereafter, sine the driving roller 981 is pulled in the direction of the fixed roller 982, the lower portion of the opening/closing plate 973 in which the driving roller 981 is disposed is attached toward the fixed roller 982, namely, toward the opening port of the spill way 972.

Here, the closing force, which applies in the direction that the opening/closing plate 973 is closed, of the opening/closing plate 973 is decided based on the force which applies in the direction that the opening/closing plate 973 is closed by its weight, the water pressure applying at the front surface of the opening/closing plate 973, and the attaching force of the attaching unit 980. Here, when the pressure of the main transferring tube 950 is below a predetermined level, the pressure of the main transferring tube 950 and the closing force become offset or the closing force becomes greater than the same, so that the opening/closing plate 973 maintains closed, and thus the pressure of the main transferring tube 950 exceeds a predetermined level, and overcomes the closing force, thus pushing the opening/closing plate 973 in order for the compressed liquid within the main transferring tube 950 to be discharged into the sea, so that the internal pressure becomes lowered. Thereafter, when the pressure of the main transferring tube 950 becomes lower than a predetermine level again, the pressure of the compressed liquid applied to the turbine T through the main transferring tube 950 always becomes constant.

Here, the attaching unit 980 may include one driving roller 981 and one fixed roller 982. In this case, the weight 984 should be made heavier than before. So, there are provided the first through fourth driving rollers 981a through 981d and the first through fifth fixed rollers 982a through 982e so as to reduce the weight of the weight 984. Namely, it has a multilayer structure.

The compressed liquid supplied from the main transferring tube 950 in the compressed liquid transferring process is introduced into the turbine T through the spiral tube 953 connected to the branched tube 952. Here, the spiral portion of the spiral tube 953 is formed in the counterclockwise direction in the northern region of the earth, and in case of the southern region of the same, the spiral portion of the same is formed in the clockwise direction so that the apparatus can receive less forwarding force due to the rotation of the earth, thus more effectively using the compressed liquid.

In addition, in case that the compressed liquid generation unit 700 is the liquid pump, the pressure water which drives the turbine T and is then discharged is discharged in the air over the sea level through the discharging port 170 of the turbine T. Since the turbine T is disposed at the auxiliary frame 160 higher than the upper surface of the frame 100, and the discharging port 170 is located at a predetermined portion higher than the sea level, the pressure water is well discharged through the discharging path D.

In case that the compressed liquid generation unit 700 is the hydraulic pump, being different from the liquid pump, the pressure air which drives the hydraulic turbine is discharged into the air.

FIGS. 18A through C show one example of the turbine T and the power generator G which are adapted in the present invention. Here, any type of the same may be used without departing the scopes of the claims of the present invention.

The electric power generated by the power generator is converted by the power sector S1, and is supplied to the corresponding elements at the land through the seabed cable or the like.

FIG. 19 shows another embodiment of the power generator, which includes a central control headquarter HQ having a power transformer, a power supply facility, an office, a lodging facility, and the like, and a power generation headquarter SQ having a power generation sector S1, and a compressed liquid generation sector S2 and arranged at the periphery of the central control headquarter HQ, so that the electric power generated by each power generation headquarter is gathered by the central control headquarter HQ and is then transformed, and is thus supplied to the corresponding elements at the land through the seabed cable or the like.

In addition, it is unnecessary to equip with the office or the lodging facility at the power generation sector S1 since persons does not reside there. However, there should be provided an emergency facility for accidents, maintenance or the like. The usual management, the control, and the like are performed by the central control headquarter HQ.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for generating an electric power using a wave force, comprising:

a frame having a central power generation sector S1 disposed at a predetermined depth of the sea within a predetermined area of a construction site of the apparatus; and a plurality of pressurized liquid generation sectors S2 spaced-apart by a predetermined distance with respect to the central power generation sector S1;

support means for movably supporting the frame at the sea;

rotation means disposed at the pressurized liquid generation sector S2 of the frame, a predetermined portion of the same being protruded beyond the sea level;

lifting/lowering support means connected to an upper portion of the rotation means;

a plurality of buoys connected to each of the end portions of the lifting/lowering support means;

rotation force generation means disposed at each of the buoys for converting the lifting/lowering movement into a rotation force, and including a support member rotatable and vertically disposed at the pressurized liquid generation sector S2;

pressurized liquid generation means disposed at an upper surface of each buoy;

one-directional driving means for transferring one-directional force of the rotation force generation means to the pressurized liquid generation means;

pressurized liquid generation means for transferring the pressurized liquid discharged from the pressurized liquid generation means to the power generation sector S1;

a turbine T disposed at the power generation sector S1 for generating a driving force necessary for the power generation in cooperation with the pressurized liquid transferred from the pressurized liquid generation means; and a power generator F driven by the turbine T.

2. The apparatus of claim 1, wherein said frame includes a reinforcing member reinforcingly connecting frame main members which are arranged in a lattice form and the frame main member.

3. The apparatus of claim 2, wherein a frame main member of the frame is hollow, and a compressed air is inserted into a part of the same to have a predetermined float force, and the other part of the same is used as a pipe line for transferring the pressurized liquid therethrough.

4. The apparatus of claim 1 wherein said frame support means includes a plurality of anchor blocks placed on the sea bed, and an anchor rope for connecting the frame and the anchor block.

5. The apparatus of claim 4, wherein a plurality of branched ropes are connected to an upper portion of the anchor rope, and each branched rope is connected to the frame.

6. The apparatus of claim 4, wherein tension control means is disposed between a lower surface of the frame and the upper portion of the branched rope.

7. The apparatus of claim 6, wherein said tension force control means includes:
connection rings connected to the lower surface of the frame and the upper portion of the branched rope, respectively;
rollers slidably disposed at the end portion opposed to the connecting rings; and a tightening wire rope wound between the rollers, whereby the tension force between the anchor rope and the branched rope is adjusted by tightening the rope between the rollers.

8. The apparatus of claim 1, wherein said support member includes a hollow tube body, which is used as a transferring path of the pressurized liquid, formed therewithin, and a streamline shape portion integrally formed with the hollow tube body and having a triangle-shaped cross-sectional view so as to reduce the horizontal contact resistance with the sea water.

9. The apparatus of claim 1, wherein said lifting/lowering means includes:
a wire rope connected to the upper portion which is protruded from the rotation means beyond the sea level; and
a connection rod connected to the end portion of the wire rope to which the buoy is connected.

10. The apparatus of claim 9, wherein said connection rod is formed as a triangle of which its rear portion to which the buoy is connected is wider than its front portion.

11. The apparatus of claim 1, wherein said buoy is vessel-shaped, and an intermediate portion of the front longer side between two longer sides is movably and pivotally connected to the end portion of the lifting/lowering support means.

12. The apparatus of claim 11, wherein the weight center of said buoy is positioned at a predetermined portion eccentric from the center portion of the same to the rear side.

13. The apparatus of claim 11, wherein said buoy includes a casing portion disposed between the rotation force generation means and the pressurized liquid generation means.

14. The apparatus of claim 1, wherein said rotation force generation means includes:
a rotation drum rotatable within the casing portion of the buoy;
a driving wire rope fixed to the winding start portion of the rotation drum, of which its one end being connected to a predetermined portion of the rotation means; and
a rotation elastic member for elastically supporting the rotation drum in the direction that the wire rope is wound.

15. The apparatus of claim 14, wherein said rotation drum includes:
a cylindrical portion on which the driving wire rope is wound; and a circular plate portion attached to both sides of the cylindrical portion and rotatably supported by the fixing shaft fixed to the casing portion.

16. The apparatus of claim 15, wherein a groove is formed at a predetermined portion of the cylindrical portion of the rotation drum, said groove being inserted with a safety pin to which the winding start portion of the driving wire rope is connected in order for the safety pin to be escaped from the groove in a state that the driving wire rope is substantially released from the rotation drum and in order for the driving wire rope to be escaped from the rotation drum.

17. The apparatus of claim 1, wherein said one-directional driving means includes:
a driving shaft extended from one side of the rotation force generation means;
a driving sprocket connected to the driving shaft in cooperation with a one-directional clutch;
a generation means sprocket fixed to a shaft of the pressurized liquid generation means;
a chain connected between the driving sprocket and the generation means sprocket.

18. The apparatus of claim 1, wherein said pressurized liquid transferring means includes:
a pressurized liquid transferring hose connected to a discharging port of the pressurized liquid generation means and to an upper portion of the support member;
a hollow tube body of the support member connected to the pressurized liquid transferring hose;
a frame main member of the frame connected to the hollow tube body, a part of the same being used as the pipe line; and
a main transferring tube, which is vertically disposed at the power generation sector S1, connected between the frame main member and the turbine T.

19. The apparatus of claim 18, wherein a serge tank is disposed at a predetermined portion of the path of the pressurized liquid transferring means so as to release the pulsatory phenomenon of the pressurized liquid.

20. The apparatus of claim 19, wherein said serge tank includes:
a cylindrical section fixed to the lower surface of the frame and surrounding the lower portion of the main transferring tube; and
upper and lower spherical plates forming the upper and lower surfaces of the cylindrical section.

21. The apparatus of claim 20, wherein a curved portion is formed at the inner end of the frame main member passing through the wall of the serge tank so as to introduce the pressurized liquid in the direction reverse to the spiral direction of the pressurized liquid within the serge tank which occurs by the forwarding force due to the rotation of the earth.

22. The apparatus of claim 21, wherein said cylindrical section of the serge tank is formed with a double tube and includes an air pocket into which the compressed air is filled.

23. The apparatus of claim 22, wherein an air chamber which is defined between the upper spherical plate and the sea level within the tank is disposed at the upper portion of the serge tank.

24. The apparatus of claim 20, wherein said main transferring tube has the upper portion which is extended more than the frame and includes a spill valve, which serves as a governor, at the periphery of its upper portion.

25. The apparatus of claim 24, wherein said governor spill valve includes:

a spill hole formed at the branched portion of the main transferring tube;

a spill way attached to outer side of the spill hole;

an opening/closing plate rotatably disposed at the outer wall of the main transferring tube for opening/closing the spill way; and attaching means for pushing the opening/closing plate to the outer portion of the spill way.

26. The apparatus of claim 25, wherein said opening/closing plate includes its upper portion supported by the support shaft at the bracket fixed to the main wall of the main transferring tube, and said attaching means includes:

a driving roller disposed at both sides of the lower portion of the opening/closing plate;

a fixed roller fixed to both sides of the wall of the main transferring tube;

an attaching wire rope wound between the driving roller and the fixed roller wherein the winding start portion of the same is fixed to the fixed roller;

direction conversion rollers for converting the direction of the wire rope; and a weight fixed to the end portion of the wire rope for generating weight which serves to pull the rope.

* * * * *